United States Patent
Gerö et al.

(10) Patent No.: US 12,009,964 B2
(45) Date of Patent: Jun. 11, 2024

(54) MULTI-DOMAIN ORCHESTRATION

(71) Applicant: Telefonaktiebolaget LM Ericsson (publ), Stockholm (SE)

(72) Inventors: Balázs Peter Gerö, Budapest (HU); János Harmatos, Budapest (HU); Dávid Jocha, Budapest (HU); Balázs Sonkoly, Budapest (HU); Róbert Szabó, Budapest (HU)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 191 days.

(21) Appl. No.: 17/436,779

(22) PCT Filed: Mar. 29, 2019

(86) PCT No.: PCT/IB2019/052618
§ 371 (c)(1),
(2) Date: Sep. 7, 2021

(87) PCT Pub. No.: WO2020/201808
PCT Pub. Date: Oct. 8, 2020

(65) Prior Publication Data
US 2022/0014418 A1 Jan. 13, 2022

(51) Int. Cl.
G06F 15/173 (2006.01)
G06F 16/22 (2019.01)
(Continued)

(52) U.S. Cl.
CPC ........ H04L 41/042 (2013.01); G06F 16/2255 (2019.01); H04L 41/0803 (2013.01)

(58) Field of Classification Search
CPC ............... H04L 41/042; H04L 41/0803; G06F 16/2255
(Continued)

(56) References Cited

U.S. PATENT DOCUMENTS 7,743,093 B2 * 6/2010 Damour ................ G06Q 30/02
709/200
9,565,074 B2 2/2017 Lehane et al.
(Continued)

FOREIGN PATENT DOCUMENTS

EP 2518944 A1 10/2012

OTHER PUBLICATIONS

Author Unknown, "ETSI GR NFV-IFA 028 V3.1.1", Network Functions Virtualisation (NFV) Release 3; Management and Orchestration; Report on architecture options to support multiple administrative domains, Jan. 2018, 1-59.
(Continued)

*Primary Examiner* — Richard G Keehn
(74) *Attorney, Agent, or Firm* — Murphy, Bilak & Homiller, PLLC

(57) ABSTRACT

A first orchestrator (20-1) for a first domain (10-1) is configured for multi-domain orchestration. The first orchestrator (20-1) receives an inbound orchestration request (22) that requests orchestration of one or more inbound targets (24) and that includes one or more records (26). The one or more records (26) either indicate an ancestry of each of the one or more inbound targets (24) or indicate an ancestry of the inbound orchestration request (22). The first orchestrator (20-1), based on the one or more records (26) included in the inbound orchestration request (22), evaluating whether or not to send from the first domain (10-1) to a second domain (10-2) an outbound orchestration request (28) that requests orchestration of an outbound target (30). The outbound target (30) is one of, or is a descendant of at least one of, the one or more inbound targets (24). The first orchestrator (20-1) then sends or does not send the outbound orchestration request (28) from the first domain (10-1) to the second domain (10-2) depending on the evaluation.

15 Claims, 16 Drawing Sheets

(51) Int. Cl.
  *H04L 41/042* (2022.01)
  *H04L 41/0803* (2022.01)
(58) Field of Classification Search
  USPC ............................................... 709/223, 224
  See application file for complete search history.

(56) References Cited

U.S. PATENT DOCUMENTS

| | | | | |
|---|---|---|---|---|
| 9,608,813 | B1* | 3/2017 | Roth | H04L 63/0807 |
| 9,866,467 | B1* | 1/2018 | Barnum | H04L 69/24 |
| 11,641,319 | B2* | 5/2023 | Richards | H04L 43/14 |
| | | | | 709/224 |
| 2003/0106067 | A1* | 6/2003 | Hoskins | H04L 69/167 |
| | | | | 725/111 |
| 2004/0018844 | A1* | 1/2004 | Cheng | H04W 28/02 |
| | | | | 455/406 |
| 2007/0143827 | A1* | 6/2007 | Nicodemus | H04L 63/102 |
| | | | | 726/2 |
| 2009/0233623 | A1* | 9/2009 | Johnson | H04W 84/18 |
| | | | | 455/456.3 |
| 2012/0033673 | A1* | 2/2012 | Goel | H04L 49/70 |
| | | | | 370/400 |
| 2013/0339498 | A1* | 12/2013 | Johnson | H04L 67/104 |
| | | | | 709/221 |
| 2016/0373588 | A1* | 12/2016 | Raleigh | H04L 12/1407 |
| 2017/0104847 | A1 | 4/2017 | Zhang et al. | |
| 2017/0187604 | A1* | 6/2017 | Dixon | H04L 67/75 |
| 2018/0041470 | A1* | 2/2018 | Schultz | H04L 63/0263 |
| 2019/0095916 | A1* | 3/2019 | Jackson | G06Q 20/405 |
| 2019/0132350 | A1* | 5/2019 | Smith | G06F 21/577 |
| 2022/0014418 | A1* | 1/2022 | Gerö | H04L 41/042 |
| 2022/0400061 | A1* | 12/2022 | Neill | G05D 1/104 |
| 2023/0048306 | A1* | 2/2023 | Roque | G06F 9/505 |

OTHER PUBLICATIONS

Author Unknown, "ETSI GS NFV-IFA 011 V2.1.1", Network Functions Virtualisation (NFV); Management and Orchestration; VNF Packaging Specification, Oct. 2016, 1-53.

Author Unknown, "TOSCA Simple Profile in YAML Version 1.2", Committee Specification Draft 02 / Public Review Draft 01, Oasis, Dec. 7, 2017, 1-354.

Gerö, Balázs Péter, et al., "5GEx Final System Requirements and Architecture", Deliverable 2.2, 5GExchange, Dec. 31, 2017, 1-181.

Guerzoni, Riccardo, et al., "Analysis of end-to-end multi-domain management and orchestration frameworks for software defined infrastructures: an architectural survey", Transactions on Emerging Telecommunications Technologies, Trans. Emerging Tel. Tech., Published online in Wiley Online Library (wileyonlinelibrary.com). DOI: 10.1002/ett.3103, Jul. 24, 2016, pp. 1-19.

Kind, Mario, et al., "Deliverable 2.1: Use Cases and Initial Architecture Dissemination level", Version 1.0, Unifying Cloud and Carrier Networks, Aug. 28, 2014, 1-131.

Rekhter, Y., et al., "A Border Gateway Protocol 4 (BGP-4)", Network Working Group, Request for Comments: 4271, Obsoletes: 1771, Category: Standards Track, Jan. 2006, 1-104.

Tavernier, Wouter, et al., "D3.1 Programmability framework", Version 1.0, Unifying Cloud and Carrier Networks, Nov. 14, 2014, 1-203.

* cited by examiner

MULTI-DOMAIN ORCHESTRATION

TECHNICAL FIELD

The present application relates generally to orchestration and relates more particularly to multi-domain orchestration.

BACKGROUND

Network operators traditionally implement network functions using physical network nodes so that the network functions are tightly coupled with the infrastructure they run on. As a result, designing and deploying end-to-end services requires manual processes performed via Operation Support Systems (OSSs), with long lead times on the order of weeks or months.

Virtualization technologies such as Network Function Virtualization (NFV) offer network operators a software-centric approach to create, deploy, and manage their services with greater efficiency, flexibility, and cost-effectiveness. Virtualization abstracts the underlying infrastructure's hardware resources (e.g., compute, storage, and network resources) to define virtualized resources. These virtualized resources are leveraged for providing virtualized network functions (VNFs), e.g., in the form of routers, gateways, traffic analysis, firewalls, etc. The VNFs can be chained with one another and/or with physical network functions (PNFs) as building blocks to offer a network service, e.g., which may comprise all or part of an end-to-end network service.

Orchestration refers to the process of controlling the resources and/or network services that rely on those resources. Orchestration may for instance involve controlling the access to and/or allocation of resources for VNFs or network services. Orchestration may alternatively or additionally involve instantiating, scaling, updating, and/or terminating network services, e.g., by coordinating groups of VNFs to realize the network services. Orchestration may therefore entail interpreting and translating a given service request into a configuration of resources (physical and/or virtualized), as needed for service establishment.

Orchestration proves challenging in a multi-domain environment. In this environment, virtualization resources and/or services are offered and consumed by multiple different domains. These domains may be administrative domains that each correspond to a collection of systems and networks operated by a single administrative authority or organization, e.g., network operator or service provider. Or, the domains may be technological domains, functional domains, or logical domains. In any of these cases, the multi-domain environment advantageously enables multi-tenant use cases like a tenant organization running VNF instances on virtualized infrastructure operated by a different organization, or one tenant organization using network services offered by another organization. But multi-domain operation complicates orchestration because it requires local orchestrators, responsible for orchestration only in their respective domains, to effectively cooperate with one another to provide end-to-end services. Especially in a hierarchical architecture where parent/child relationships are established between local orchestrators to facilitate multi-domain orchestration, such cooperation may entail one local orchestrator requesting another local orchestrator to orchestrate a resource, VNF, or network service.

One complicating factor in this and other architectures for multi-domain orchestration is the risk that infinite loops develop as local orchestrators for different domains pass orchestration requests amongst one another. Infinite loops of this nature threaten to stall or outright derail multi-domain orchestration attempts, as well as waste infrastructure resources.

SUMMARY

Some embodiments herein introduce record(s) into an orchestration request that a recipient of the request can leverage to prevent undesirable loops in multi-domain orchestration. The record(s) may for instance indicate an ancestry of the request or indicate an ancestry of the resource, virtual network function, or other target whose orchestration is requested. An orchestrator that receives the request can leveraging such an ancestry indication in order to avoid contributing to an infinite loop among cooperating orchestrators in different domains.

More particularly, embodiments herein include a method for multi-domain orchestration. The method is performed by a first orchestrator for a first domain. The method comprises receiving an inbound orchestration request that requests orchestration of one or more inbound targets and that includes one or more records that either indicate an ancestry of each of the one or more inbound targets or indicate an ancestry of the inbound orchestration request. The method in some embodiments also includes, based on the one or more records included in the inbound orchestration request, evaluating whether or not to send from the first domain to a second domain an outbound orchestration request that requests orchestration of an outbound target. This outbound target is one of, or is a descendant of at least one of, the one or more inbound targets. The method may also entail sending or not sending the outbound orchestration request from the first domain to the second domain depending on the evaluating.

In some embodiments, the evaluation may comprise determining, based on the one or more records included in the inbound orchestration request, whether or not the ancestry of the inbound orchestration request includes the first orchestrator has requesting the second domain to orchestrate the outbound target. The evaluation may then comprise deciding to send or not send the outbound orchestration request to the second domain depending respectively on whether the ancestry of the inbound orchestration request does not include or does include the first orchestrator requesting the second domain to orchestrate the outbound target.

In some embodiments, the one or more records indicate an ancestry of the inbound orchestration request. In one embodiment, for example, the one or more records include, for each inbound target, a record that indicates one or more lines in the ancestry of the inbound orchestration request attributable to that inbound target. Alternatively or additionally, the record for each inbound target in some embodiments comprises a Bloom filter. In this case, the evaluation may comprise testing whether the Bloom filter for an inbound target that is or is an ancestor of the outbound target contains a set of one or more hashes of a test identity tuple. The test identity tuple includes an identity of the outbound target, an identity of the first domain as the requestor domain, and an identity of the second domain as the requestee domain. In this case, transmitting or not transmitting may comprise transmitting or not transmitting the outbound orchestration request from the first domain to the second domain depending respectively on whether the Bloom filter does not contain or does contain the set of the one or more hashes of the test identity tuple.

In some embodiments, the method may also comprise generating the outbound orchestration request to include an outbound record that indicates one or more lines in an ancestry of the outbound orchestration request attributable to the outbound target.

In some embodiments, the outbound record comprises, or is generated from, an identity tuple. The identity tuple includes: an identity of the outbound target; an identity of the first domain as a requestor domain; and an identity of the second domain as a requestee domain. In one embodiment, the method may comprise generating the outbound record by: calculating one or more hashes of the identity tuple; and inserting the one or more calculated hashes into a Bloom filter comprising the outbound record.

In other embodiments, the method may further comprise maintaining a stored record at the first orchestrator for each pending outbound target that is pending with respect to the second domain, In this case, the stored record for a pending outbound target may indicate an ancestry of the pending outbound target as of when the first orchestrator requested the second domain to orchestrate the pending outbound target. The evaluation may then be performed based on the one or more records included in the inbound orchestration request and on one or more stored records at the first orchestrator for one or more pending outbound targets that are pending with respect to the second domain. For example, in some embodiments, the evaluation comprises deciding to not send the outbound orchestration request to the second domain responsive to determining that each of multiple blocking conditions is met. The blocking conditions may include, for instance: (i) a stored record is maintained at the first orchestrator for a pending outbound target that is pending with respect to the second domain and that is of the same type as the outbound target; and (ii) the ancestry of the pending outbound target that is of the same type as the outbound target at least partially overlaps with the ancestry of at least one of the one or more inbound targets.

In some embodiments, the one or more records included in the inbound orchestration request comprise a record for each of the one or more inbound targets. The record for an inbound target may indicate the ancestry of the inbound target and comprise an inbound Bloom filter. In this case, the inbound Bloom filter includes an identity associated with the inbound target and an identity associated with each ancestor of the inbound target. Alternatively or additionally, the stored record for a pending outbound target may comprise an outbound Bloom filter. The outbound Bloom filter includes an identity associated with the pending outbound target and an identity associated with each ancestor of the pending outbound target. In these and other cases, the ancestry of the pending outbound target that is of the same type as the outbound target may at least partially overlaps with the ancestry of at least one of the one or more inbound targets if the outbound Bloom filter for that pending outbound target is included in the inbound Bloom filter for at least one of the one or more inbound targets.

In some embodiments, the stored record for a pending outbound target also indicates resource requirements of the pending outbound target. In this case, the outbound orchestration request may request orchestration of the outbound target with certain resource requirements. The blocking conditions may further include: the resource requirements of the pending outbound target that is of the same type as the outbound target are less than or equal to resource requirements of the outbound target.

In some embodiments, the one or more records included in the inbound orchestration request indicate an ancestry of each of the one or more inbound targets.

In some embodiments, the method may further comprise generating the outbound orchestration request to include an outbound record that indicates an ancestry of the outbound target.

In some embodiments, the method further comprises generating the outbound orchestration request to include an outbound record that indicates an ancestry of the outbound target. In one embodiment, generating the outbound record comprises either: copying a record that is included in the inbound orchestration request for an inbound target that is the same as the outbound target; or copying a record that is included in the inbound orchestration for an immediate ancestor of the outbound target, and adding to the copied record a random identity associated with the outbound target.

In some embodiments, the one or more inbound targets and the outbound target are each either a network service, a resource, or a virtual network function, VNF.

Embodiments herein also include a method for multi-domain orchestration. The method is performed by a first orchestrator for a first domain. The method comprises generating an orchestration request that requests orchestration of a target and that includes a record that either indicates an ancestry of the target or indicates one or more lines in an ancestry of the orchestration request attributable to the target. The method also comprises transmitting the orchestration request from the first orchestrator to a second orchestrator for a second domain.

In some embodiments, the record indicates one or more lines in an ancestry of the orchestration request attributable to the target. In one embodiment, for example, the record comprises, or is generated from, an identity tuple, wherein the identity tuple includes: an identity of the target; an identity of the first domain as a requestor domain; and an identity of the second domain as a requestee domain. In this case, the method may comprise generating the record by: calculating one or more hashes of the identity tuple; and inserting the one or more calculated hashes into a Bloom filter comprising the record.

In other embodiments, the method may comprise maintaining a stored record at the first orchestrator indicating any targets, and resource requirements thereof, for which the first orchestrator has sent a request to the second domain to orchestrate but has not received acknowledgement indicating whether the second domain has accepted or rejected the request. In one embodiment, for instance, the record includes: an identity associated with the target; and, for each of any ancestors of the target, an identity associated with that ancestor. In any of these embodiments, the one or more inbound targets and the outbound target may each be either a network service, a resource, or a virtual network function, VNF.

Embodiments further include corresponding apparatus, computer programs, and carriers. For example, embodiments include a first orchestrator configured for use in a first domain. The first orchestrator is configured (e.g., via communication circuitry and processing circuitry) to receive an inbound orchestration request that requests orchestration of one or more inbound targets and that includes one or more records that either indicate an ancestry of each of the one or more inbound targets or indicate an ancestry of the inbound orchestration request. The first orchestrator is also configured to, based on the one or more records included in the inbound orchestration request, evaluate whether or not to send from the first domain to a second domain an outbound orchestration request that requests orchestration of an outbound target. Here, the outbound target is one of, or is a descendant of at least one of, the one or more inbound targets. The first orchestrator is also configured to send or not send the outbound orchestration request from the first domain to the second domain depending on the evaluating.

Embodiments further include a first orchestrator configured for use in a first domain. The first orchestrator is configured (e.g., via communication circuitry and processing circuitry) to generate an orchestration request that requests orchestration of a target and that includes a record that either indicates an ancestry of the target or indicates one or more lines in an ancestry of the orchestration request attributable to the target. The first orchestrator is further configured to transmit the orchestration request from the first orchestrator to a second orchestrator for a second domain.

DETAILED DESCRIPTION

Figure 1:
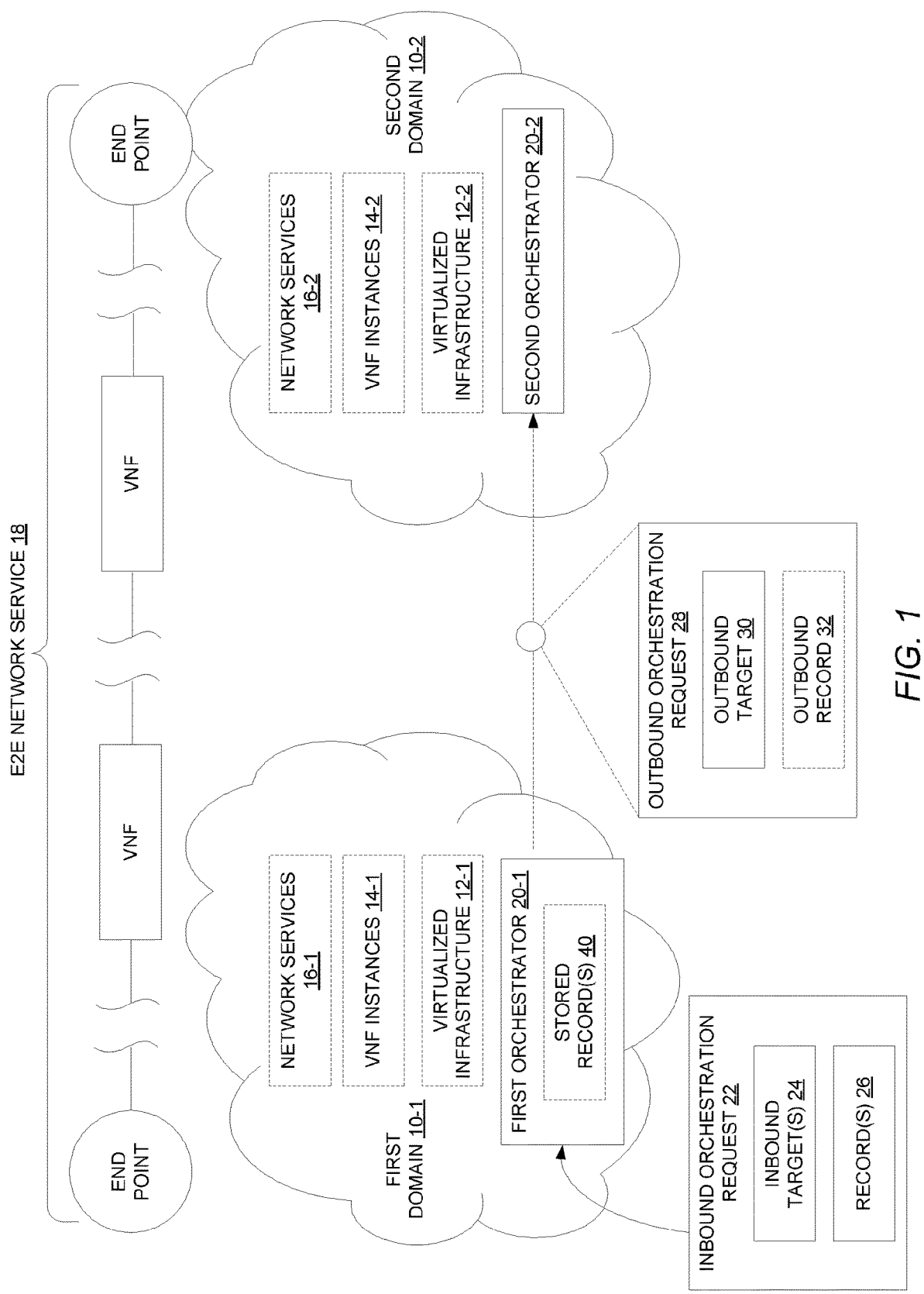
FIG. 1 is a block diagram of first and second domains in a multi-domain orchestration system according to some embodiments.

FIG. 1 shows a first domain 10-1 and a second domain 10-2 configured for multi-domain orchestration according to some embodiments herein. The first and second domains 10-1, 10-2 in some embodiments are different administrative domains. Each administrative domain may constitute its own collection of system(s) and network(s) operated by a single administrative authority or organization, e.g., a network operator, a service provider, or a certain department within such an operator or provider. In other embodiments, the domains 10-1, 10-2 may be technological domains that correspond to heterogeneous technologies, e.g., in terms of network segments covering radio access, fixed access, metro aggregation, core transport, etc. In still other embodiments, the domains 10-1, 10-2 may be functional or logical domains responsible for different types of functionality.

In this context, the first and second domains 10-1, 10-2 as shown may have respective virtualized infrastructure 12-1, 12-2. Each virtualized infrastructure 12-1, 12-2 may virtualize hardware resources (e.g., compute, storage, and network resources) via a virtualization layer into virtualized resources. These virtualized resources may be leveraged for providing virtualized network functions (VNFs), e.g., to provide functionality in the form of routers, gateways, deep packet inspection (DPI), firewalls (FWs), etc. Instances 14-1, 14-2 of the VNFs provided in the respective domains 10-1, 10-2 can then be chained with one another and/or with physical network functions (PNFs) as building blocks in order for the first and second domains 10-1, 10-2 to offer network services 16-1, 16-2. The VNF instances 14-1, 14-2 and/or the network services 16-1, 16-2 may even be connected across the different domains 10-1, 10-2 to realize at least a portion of an end-to-end network service 18 that spans multiple domains.

The first and second domains 10-1, 10-2 have respective first and second orchestrators 20-1, 20-2 that orchestrate the resources (virtual and/or physical) and/or network services in their respective first and second domains 10-1, 10-2. In some embodiments, for example, the orchestrators 20-1, 20-2 each correspond to ETSI MANO NFV Orchestrators (NFVOs). Regardless, this orchestration may involve for instance controlling the access to and/or allocation of resources for VNF instances 14-1, 14-2 or network services 16-1, 16-2. Orchestration may alternatively or additionally involve instantiating, scaling, updating, and/or terminating network services 16-1, 16-2, e.g., by coordinating groups of VNFs to realize the network services. Orchestration may therefore entail interpreting and translating a given service request into a configuration of resources (physical and/or virtualized), as needed for service establishment.

The first and second orchestrators 20-1, 20-2 support multi-domain orchestration according to some embodiments herein. FIG. 1 in this regard shows that the first orchestrator 20-1 is configured to receive an inbound orchestration request 22, e.g., from an entity requesting a service, from the second orchestrator 20-2, or from another orchestrator in another domain not shown. This inbound orchestration request 22 requests the orchestration of one or more inbound targets 24, e.g., in the form of one or more network services, one or more resources, and/or one or more VNFs.

In some cases, the first orchestrator 20-1 may be able to accommodate the request by orchestrating one or more of the inbound target(s) 24 in the first domain 10-1. The first orchestrator 20-1 may for instance orchestrate an inbound target directly. Or, the first orchestrator may instead decompose or combine an inbound target into one or more descendants of that inbound target and orchestrate one or more of those descendant(s) as a substitute for the inbound target. For example, an inbound target that is a parental control VNF may be decomposed into and substituted by descendants that include a firewall VNF and a deep packet inspection VNF.

The first orchestrator 20-1 however may decide not to orchestrate one or more of the inbound target(s) 24 or a descendant thereof. The first orchestrator 20-1 may for example determine that the first domain 10-1 lacks the capability and/or underlying resources to do so, or lacks enough margin in its resources to do so. For these or other reasons, then, the first orchestrator 20-1 may consider whether to delegate orchestration of one or more of the inbound target(s) 24 or a descendant thereof to another domain. Such delegation would involve effectively propagating all or a portion of the inbound orchestration request 22 to the other domain by requesting the other domain to orchestrate one or more of the inbound target(s) 24 or a descendant thereof.

As shown in FIG. 1, for example, the first orchestrator 20-1 may consider whether to delegate to the second domain 10-2 orchestration of one of the inbound target(s) 24, or a descendant of at least one of the inbound target(s) 24. This delegation would involve sending to the second domain 10-2 an outbound orchestration request 28 that requests orchestration of an outbound target 30, where that outbound target 30 is one of, or is a descendant of at least one of, the inbound target(s) 24. Continuing the example above for an inbound target that is a parental control VNF, the outbound target 30 in this case could be the parental control VNF itself or could be the firewall VNF or the deep packet inspection VNF that are descendants of the parental control VNF.

According to some embodiments, the first orchestrator 20-1 evaluates whether or not to send this outbound orchestration request 28 to the second domain 10-2 based on one or more records 26 included in the inbound orchestration request 22. The first orchestrator 20-1 may for instance leverage the record(s) 26 to avoid sending the outbound orchestration request 28 to the second domain 10-2 if doing so would have contributed to an undesirable infinite loop of orchestration requests. These and other embodiments may thereby facilitate the success of multi-domain orchestration and/or conserve infrastructure resources that would otherwise be wasted with infinite orchestration loops.

Figure 2A:
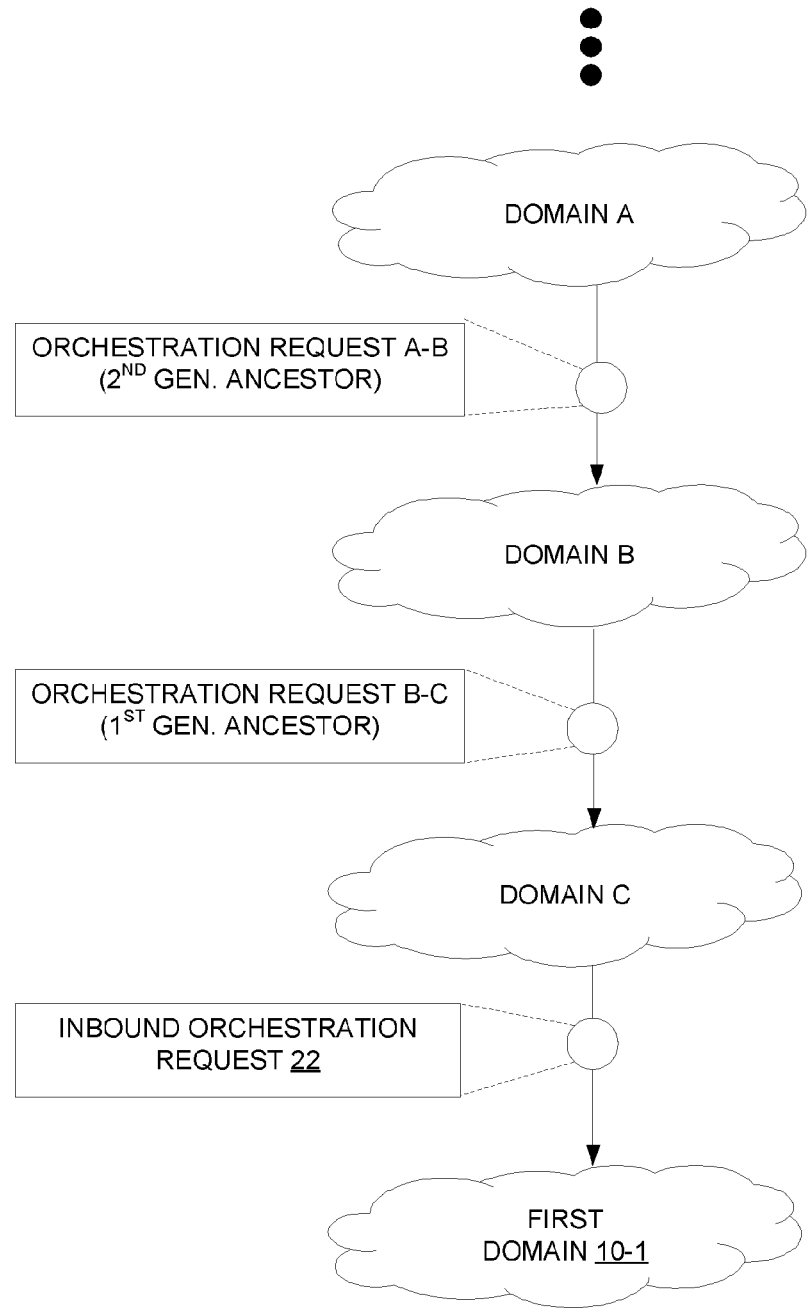
FIG. 2A is a block diagram of an ancestry of an inbound orchestration request according to some embodiments.

In some embodiments, the record(s) 26 indicate an ancestry of the inbound orchestration request 22. This ancestry in some embodiments may effectively take the form of a domain-by-domain trail or tree of orchestration requests that led to the inbound orchestration request 22 being sent to the first domain 10-1. FIG. 2A shows an example ancestry for the inbound orchestration request 22.

In this example, FIG. 2A shows that Domain A transmits to Domain B an orchestration request A-B that requests the orchestration of one or more targets. Domain B decides to delegate orchestration of at least one of the target(s), or a descendant thereof, to Domain C. Receipt of the request A-B from Domain A therefore leads to Domain B sending an orchestration request B-C to Domain C requesting the orchestration of one or more targets. Domain C in turn decides to delegate orchestration of at least one of the target(s), or a descendant thereof, to the first domain 10-1. Receipt of the request B-C from Domain B therefore leads to Domain C sending the inbound orchestration request 22 to the first domain 10-1 requesting the orchestration of the one or more inbound targets 24.

The ancestry of the inbound orchestration request 22 in this example thereby includes the orchestration request B-C sent from Domain B to Domain C as a first generation (gen.) ancestor, and the orchestration request A-B sent from Domain A to Domain B as a second generation ancestor. In some embodiments, then, the record(s) 26 included in the inbound orchestration request 22 would indicate this ancestry by indicating that the inbound orchestration request 22 was transmitted from Domain C to the first domain 10-1, that orchestration request B-C as one ancestor was transmitted from Domain B to Domain C, and that orchestration request A-B as another ancestor was transmitted from Domain A to Domain B. That is, the record(s) 26 may effectively identify the orchestration requests, and the domains between which they were sent, which led to the inbound orchestration request 22. The record(s) 26 may in some embodiments capture the progression, chaining, and/or ordering of these orchestration requests, e.g., request A-B led to request B-C which led to the first request 10-1, so as to effectively trace the ancestry. In other embodiments, though, the record(s) 26 may simply identify the orchestration requests, and the domains between which they were sent, included in the inbound orchestration request's ancestry, without explicitly or more particularly identifying how those requests are linked or ordered in that ancestry. That is, the record(s) 26 in this case may indicate the request's ancestry in the sense that the record(s) 26 simply identify the inbound orchestration request's ancestors, without more explicitly reflecting the relationship or lineage between those ancestors.

Regardless of the particular nature of the record(s) 26, though, the record(s) 26 may enable the first orchestrator 20-1 in the first domain 10-1 to check whether the outbound orchestration request 28 being sent from the first domain 10-1 to the second domain 10-2 is already recorded as part of the inbound orchestration request's ancestry. With respect to the example in FIG. 2A, for instance, the first orchestrator 20-1 may check whether the record(s) 26 identify Domain A as corresponding to the first domain 10-1, orchestration request A-B as corresponding to the outbound orchestration request 28, and Domain B as corresponding to the second domain 10-2. And the first orchestrator 20-1 may similarly check whether the record(s) 26 identify Domain B as corresponding to the first domain 10-1, orchestration request B-C as corresponding to the outbound orchestration request 28, and Domain C as corresponding to the second domain 10-2. If either case is true, that means the first domain 10-1 has already previously sent the same outbound orchestration request 28 to the second domain 10-2 before as part of the ancestry of the inbound orchestration request 22. The first orchestrator 20-1 in this case would therefore terminate further orchestration request propagation, so as to avoid or mitigate the development of an orchestration request loop, by refraining from transmitting the outbound orchestration request 28 to the second domain 10-2.

Figure 2B:
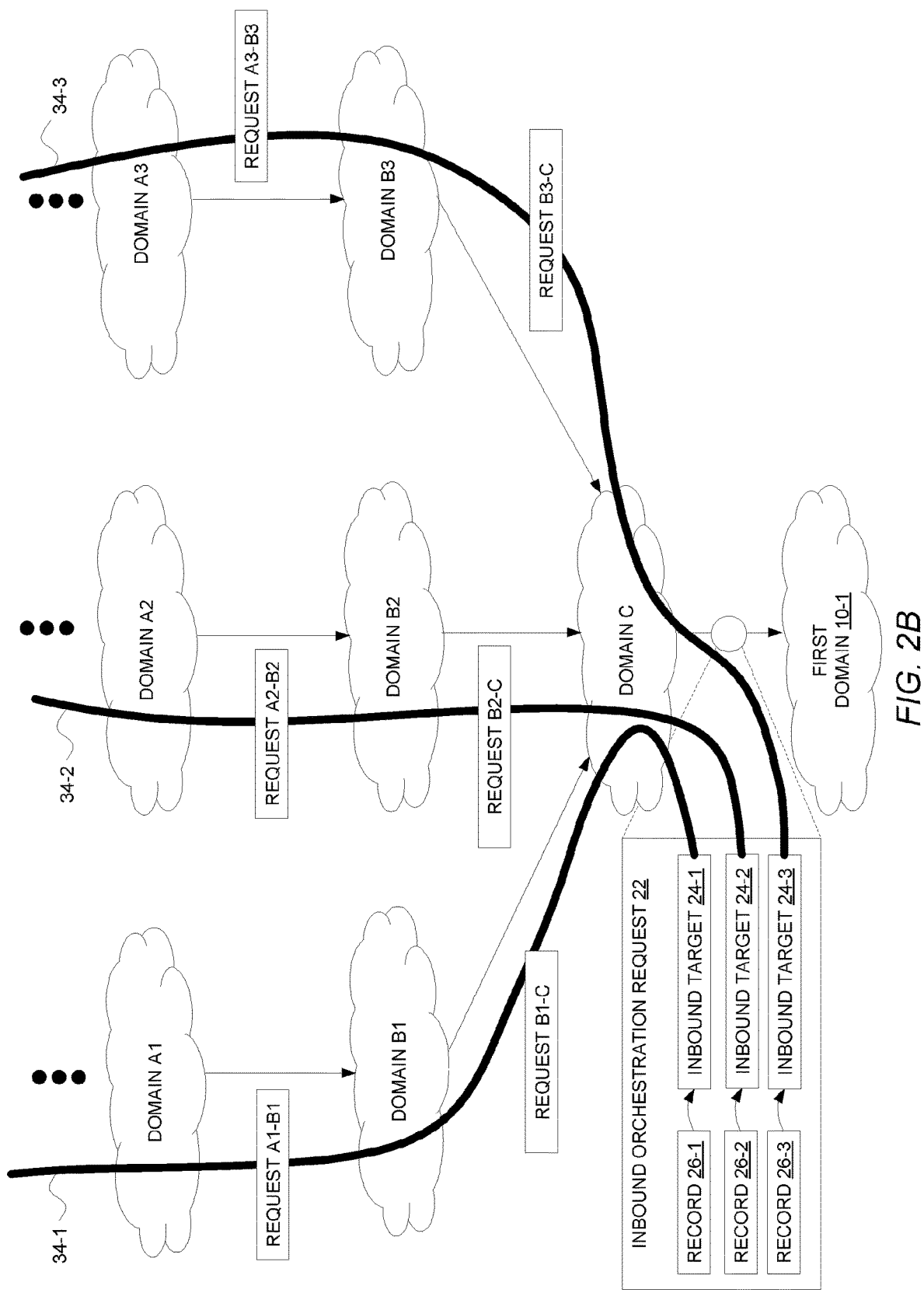
FIG. 2B is a block diagram of different lines in an ancestry of an inbound orchestration request, attributable to different inbound targets, according to some embodiments.

Although FIG. 2A illustrated the ancestry indicated by the record(s) 26 as relating in some embodiments to the inbound orchestration request 22 as a whole, the record(s) 26 in other embodiments may indicate the request's ancestry on an inbound target by inbound target basis. That is, the inbound orchestration request 22 may include record(s) 26 per inbound target, i.e., per orchestration service component (e.g., per VNF, per network service, or per vDU). These embodiments may thereby account for recursive substitution per target (e.g., per network service and/or per VNF). In these embodiments, for example, the record(s) 26 may include, for each inbound target 24, a record that indicates one or more lines in the ancestry of the inbound orchestration request 22 attributable to that inbound target 24. FIG. 2B shows an example.

In the example of FIG. 2B, the inbound orchestration request 22 requests the orchestration of three inbound targets 24-1, 24-2, and 24-3. The ancestry of the request 22 therefore may have one or more different lines attributable to different ones of the inbound targets 24-1, 24-2, and 24-3. As shown, the request's ancestry has three different lines 34-1, 34-2, and 34-3 attributable to the different inbound targets 24-1, 24-2, and 24-3, respectively. The line 34-1 attributable to inbound target 24-1 includes orchestration request B1-C sent from Domain B1 to Domain C as a first generation (gen.) ancestor, and the orchestration request A1-B1 sent from Domain A1 to Domain B1 as a second generation ancestor. Similarly, the line 34-2 attributable to inbound target 24-2 includes orchestration request B2-C sent from Domain B2 to Domain C as a first generation (gen.) ancestor, and the orchestration request A2-B2 sent from Domain A2 to Domain B2 as a second generation ancestor. And, the line 34-3 attributable to inbound target 24-3 includes orchestration request B3-C sent from Domain B3 to Domain C as a first generation (gen.) ancestor, and the orchestration request A3-B3 sent from Domain A3 to Domain B3 as a second generation ancestor.

In this context, then, the inbound orchestration request 22 as shown includes records 26-1, 26-2, and 26-3 for the inbound targets 24-1, 24-2, and 24-3, respectively. Record 26-1 indicates the line 34-1 in the request's ancestry attributable to inbound target 24-1, record 26-2 indicates the line 34-2 in the request's ancestry attributable to inbound target 24-2, and record 26-3 indicates the line 34-3 in the request's ancestry attributable to inbound target 24-3.

The target-specific nature of the record(s) 26 may enable the first orchestrator 20-1 to make decisions, on a target by target basis, about whether to request another domain to orchestrate an outbound target. Consider for example a case where the first domain 10-1 has already previously requested the second domain 10-2 to orchestrate an outbound target that is or is a descendant of inbound target 24-1, but the first domain 10-1 has not yet requested the second domain 10-2 to orchestrate an outbound target that is or is a descendant of inbound target 24-2. The first orchestrator 20-1 may detect that this is the case using the target-specific record(s) 26. The first orchestrator 20-1 may then selectively request the second domain 10-2 to orchestrate the outbound target that is or is a descendant of inbound target 24-2, and refrain from requesting the second domain 10-2 to orchestrate the outbound target that is or is a descendant of inbound target 24-1. That is, the outbound orchestration request 28 would request orchestration of the outbound target that is or is a descendant of inbound target 24-2, but would not request the orchestration of the outbound target that is or is a descendant of inbound target 24-1.

Note that the record(s) 26 in these and other embodiments may constitute any type of data structure capable of indicating evidence about the inbound orchestration request's ancestry. In some embodiments, for example, the record(s) 26 may be any type of data structure capable of indicating the set of ancestors included in the inbound orchestration request's ancestry. This set of ancestors may be indicated for instance as a set of ancestor identifiers, with each identifier identifying one ancestor in the request's ancestry. The ancestor identifiers may be structured or unstructured. For example, were the ancestry includes one domain requesting another domain to orchestrate a certain target, a structured ancestor identifier that identifies such an ancestor may be, or be a function of, an identity tuple: (i) an identity of the certain target; (ii) an identity of the requestor domain that requested orchestration of that target; and (iii) an identity of the requestee domain that received the request to orchestrate the target. In one such embodiment, the individual identities within the identity tuple are apparent or intelligible from the ancestor identifier or the record(s) 26. In other embodiments, though, a record obfuscates those individual identities, so as to render unclear or intelligible the identity or type of resource whose orchestration was requested and/or the identities of the domains between which the request was sent. This may be accomplished for instance in embodiments where the ancestor identifier is a set of one or more hashes of the identity tuple and/or where the identities of the identity tuple are local to each domain. Such obfuscation may prove advantageous, for example, to hide a domain's topology, substitutions, and/or orchestration path from other domains. This may in turn secure (e.g., avoid revealing) business-sensitive data regarding how the domain provides or implements a service.

Figure 3:
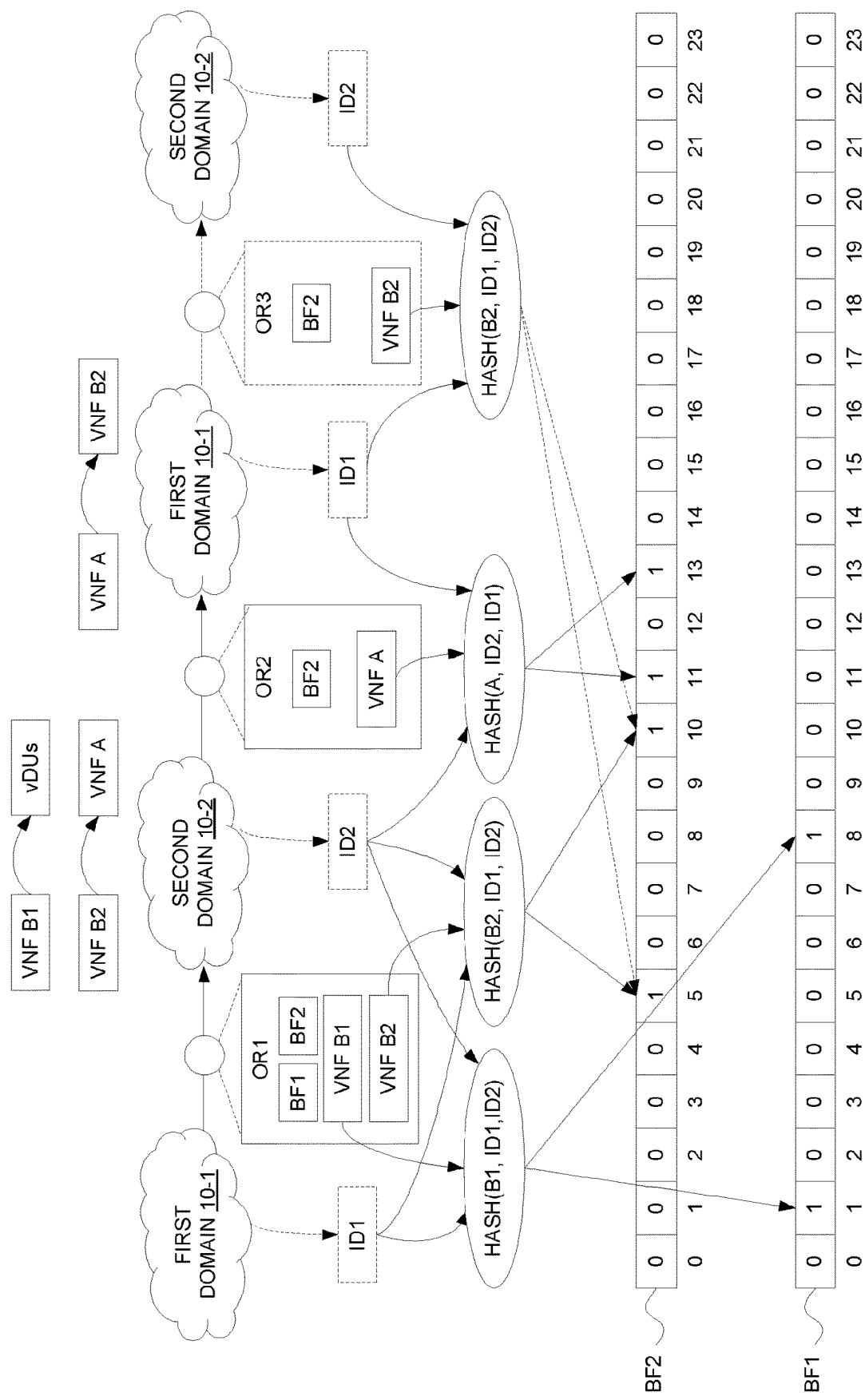
FIG. 3 is a block diagram illustrating an example of multi-domain orchestration with orchestration request loop prevention according to some embodiments.

Consider, as an example, embodiments where the record(s) 26 comprise one or more Bloom filters. In one such embodiment, the inbound orchestration request 22 includes a Bloom filter for each inbound target 24. The Bloom filter for each inbound target 24 in this case may contain, for each ancestor attributable to that inbound target 24, the ancestor's identifier. The ancestor's identifier may be or be a function of a set of one or more hashes of the identity tuple discussed above. FIG. 3 shows one example of this.

In FIG. 3, the first domain 10-1 transmits orchestration request OR1 to the second domain 10-2. The orchestration request OR1 requests the orchestration of VNF B1 and VNF B2 as targets. The first domain 10-1 generates this orchestration request OR1 to include Bloom filter BF1 for VNF B1 and Bloom filter BF2 for VNF B2. In particular, the first domain 10-1 calculates a set of two different hashes of the identity tuple {B1, ID1, ID2}, where B1 is an identity of VNF B1, ID1 is an identity of the first domain 10-1, and ID2 is an identity of the second domain 10-2. The first domain 10-1 then inserts the set of hashes into the Bloom filter BF1 for VNF B1. As shown, this means bits 1 and 8 of BF1 are set to have a value of 1, where bit 1 represents one hash output and bit 8 represents the other hash output. The Bloom filter BF1 for VNF B1 therefore indicates (at least to the first domain itself) that the first domain 10-1 has requested the second domain 10-2 to orchestrate VNF B1. Similarly, the first domain 10-1 calculates a set of two different hashes of the identity tuple {B2, ID1, ID2}, where B2 is an identity of VNF B2, and inserts the set of hashes into the Bloom filter BF2 for VNF B2. This means bits 5 and 10 of BF2 are set to have a value of 1. The Bloom filter BF2 for VNF B2 therefore indicates (at least to the first domain itself) that the first domain 10-1 has requested the second domain 10-2 to orchestrate VNF B2.

Responsive to receiving this orchestration request OR1, the second domain 10-2 substitutes VNF B1 with one or more virtualization deployment units (vDUs) so as to itself orchestrate VNF B1 as requested. However, the second domain 10-2 substitutes VNF B2 with VNF A (and possibly one or more vDUs) and decides whether to delegate orchestration of VNF A back to the first domain 10-1. The second domain 10-2 decides this based on whether the part of orchestration request OR1's ancestry attributable to VNF B2 already includes the second domain 10-2 requesting the first domain 10-1 to orchestrate VNF A. Leveraging the Bloom filter BF2 included in the orchestration request OR1 for this, the second domain 10-2 tests whether the Bloom filter BF2 contains a set of two hashes of the identity tuple {A, ID2, ID1}, where A is an identity of VNF A. The second domain 10-2 may perform this test by checking whether bits 11 and 13 of the Bloom filter B2 each have a value of 1. In this example, the second domain's check at this point reveals that neither bit 11 nor bit 13 have a value of 1. Because this means the request's ancestry does not already include the second domain 10-2 requesting the first domain 10-1 to orchestrate VNF A, the second domain 10-2 decides to do so and sends an orchestration request OR2 to the first domain 10-1 requesting orchestration of VNF A. Before sending the request OR2, though, the second domain 10-2 updates the Bloom filter BF2 to now contain the set of two hashes of the identity tuple {A, ID2, ID1}, to represent that the second domain 10-2 will now have requested the first domain 10-1 to orchestrate VNF A. It is this updated Bloom filter BF2 that the second domain 10-2 includes in the orchestration request OR2 to the first domain 10-1.

Responsive to receiving this orchestration request OR2, the first domain 10-1 substitutes VNF A with VNF B2 and decides whether to delegate orchestration of VNF B2 back to the second domain 10-2. The first domain 10-1 decides this based on whether the part of orchestration request OR2's ancestry attributable to VNF A already includes the first domain 10-1 requesting the second domain 10-2 to orchestrate VNF B2. Leveraging the Bloom filter BF2 included in the orchestration request OR2 for this, the first domain 10-1 tests whether the Bloom filter BF2 contains a set of two hashes of the test identity tuple {B2, ID1, ID2}. The first domain 10-1 may perform this test by checking whether bits 5 and 10 of the Bloom filter B2 each have a value of 1. In this example, the first domain's check reveals that indeed both bit 5 and bit 11 have a value of 1, i.e., because the first domain 10-1 already previously set those bits to have a value of 1 in conjunction with sending orchestration request OR1 to the second domain 10-1. This means the request's ancestry does already include the first domain 10-1 requesting the second domain 10-2 to orchestrate VNF B2. The first domain 10-1 therefore decides not to send (i.e., decides to block) yet another orchestration request OR3 to the second domain 10-2 requesting orchestration of VNF B2, i.e., as such risks creating or contributing to an infinite loop of orchestration requests that would have otherwise been caused by cyclic VNF substitutions.

Note that, although FIG. 3 shows the first and second domains 10-1, 10-2 each use the same identifiers ID1 and ID2 for identifying the first and second domains 10-1, 10-2, such may not be the case in some embodiments. For example, the first domain 10-1 may identify the first and second domains 10-1, 10-2 using identifiers ID1A and ID2A that are local to the first domain 10-1, while the second domain 10-2 identifies the first and second domains 10-1, 10-2 using identifiers ID1B and ID2B that are local to the second domain 10-2.

Note also that FIG. 3 just illustrated embodiments in simple terms of actions being taken by the first and second domains as a whole. But those actions are in fact performed by the first and second orchestrators for those respective domains.

As the example of FIG. 3 demonstrates, then, in some embodiments an orchestrator for a domain generates an orchestration request to include a record (e.g., Bloom filter) of having sent that request to another domain. The content of that record as set by the orchestrator (e.g., hashes inserted into the Bloom filter) may be for the orchestrator's own future reference in preventing request loops, e.g., as that same content may be unusable by or unintelligible to orchestrators of other domains. But other orchestrators may nonetheless add their own content to that same record as the record effectively propagates from request to request between domains, so that the record accumulates content from multiple orchestrators. If the record comes back to any orchestrator that had previously added content to that record, as may be the case in a request loop, the content previously added by that orchestrator may reveal to the orchestrator that it has already sent a certain request to a certain domain before as part of a request loop. In these embodiments, then, all data required for orchestration request loop prevention is carried in the orchestration requests. This advantageously enables stateless operation in orchestrators, at least with respect to loop prevention.

Figure 4A:
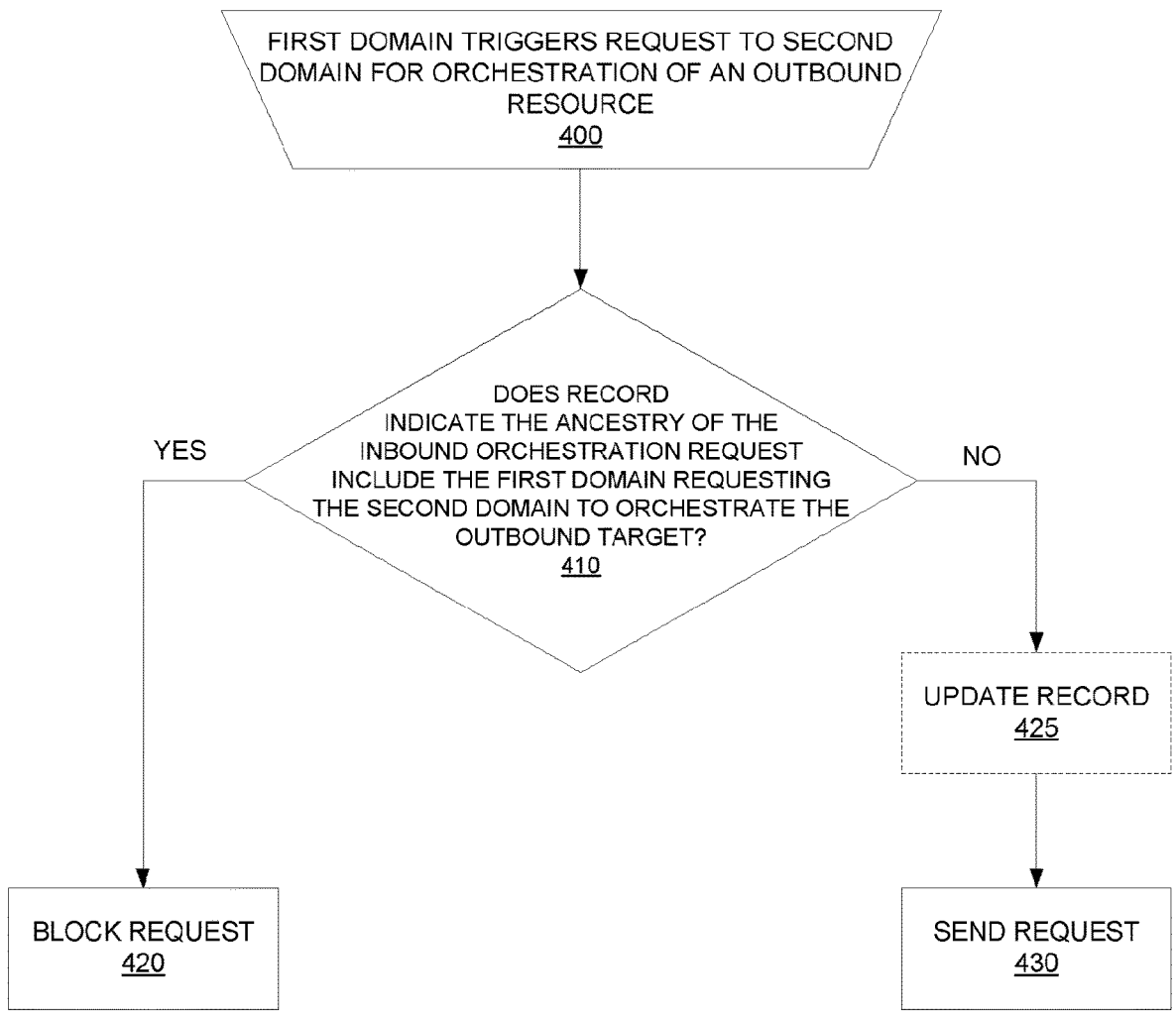
FIG. 4A is a logic flow diagram of a process for selectively sending an orchestration request to another domain according to some embodiments.

FIG. 4A illustrates a logic flow diagram of some embodiments described above. As shown, the first domain 10-1 triggers a request to the second domain 10-2 for orchestration of an outbound resource (e.g., a certain VNF) (Block 400). This triggering may occur for instance when the first orchestrator 20-1 at least tentatively decides to delegate orchestration of the outbound target (i.e., in the form of an inbound target, or a descendant thereof) to the second domain 10-2. Alternatively or additionally, this triggering may occur when the first orchestrator 20-1 at least builds an outbound orchestration request that is at least tentatively targeted for sending to the second domain 10-2 for requesting orchestration of the outbound resource. In this case, then, the first orchestrator 20-1 is about to send this outbound orchestration request, but proceeds as follows in order to avoid sending the request under some circumstances.

As shown, the first orchestrator 20-1 determines whether a record indicates the ancestry of the inbound orchestration request 22 includes the first domain 10-1 (i.e., as represented by the first orchestrator 20-1) requesting the second domain 10-2 to orchestrate the outbound target (Block 410). This may involve for instance the first orchestrator 20-1 checking the record (e.g., including in a received inbound orchestration request) for an inbound target that is or is an ancestor of the outbound target. The first orchestrator 20-1 may check this record (e.g., in the form of a Bloom filter) to determine whether the record includes a test identity tuple, where the test identity tuple includes an identity of the outbound target, an identity of the first domain 10-1 as the requestor domain, and an identity of the second domain 10-2 as the requestee domain. In some embodiments, the record may be referred to as an ancestor ID set and the test identity tuple may be referred to as an ancestor ID, in which case the first orchestrator 20-1 checks whether the ancestor ID set includes the ancestor ID for the outbound target.

If the first orchestrator 20-1 determines that there is indeed a record indicating the ancestry of the inbound orchestration request 22 includes the first domain 10-1 requesting the second domain 10-2 to orchestrate the outbound target (YES at Block 410), the first orchestrator 20-1 blocks the request (Block 420). The first orchestrator 20-1 may for instance do so by refraining from transmitting and potentially discarding the corresponding outbound request pending in an outbound queue, by refraining from generating the outbound request to begin with, or by any other way of preventing a request for the outbound resource from being made to the second domain 10-2.

On the other hand, if the first orchestrator 20-1 determines that there is no record indicating the ancestry of the inbound orchestration request 22 includes the first domain 10-1 requesting the second domain 10-2 to orchestrate the outbound target (NO at Block 410), the first orchestrator 20-1 sends a request for the outbound target to the second domain 10-2 (Block 430). The first orchestrator 20-1 may for instance do so by transmitting the corresponding outbound request already pending in an outbound queue, by generating the outbound request and sending that request to the second domain 10-2 without further scrutiny, or by any other way of sending a request for the outbound target to the second domain 10-2.

In some embodiments, the first orchestrator 20-1 updates the record (e.g., the one included in a received inbound orchestration request for an inbound target that is or is an ancestor of the outbound target) before including that record for the outbound target in the outbound request to the second domain 10-2 (Block 425). The update may for instance involve updating the record to indicate one or more lines in the ancestry of the outbound request attributable to the outbound target. In this and other embodiments, for example, the first orchestrator 20-1 may update the record to include an identity tuple, where the identity tuple includes an identity of the outbound target, an identity of the first domain 10-1 as the requestor domain, and an identity of the second domain 10-2 as the requestee domain. This may involve the first orchestrator 20-1 calculating one or more hashes of the identity tuple, and inserting the one or more calculated hashes into the record (e.g., in the form of a Bloom filter).

Figure 4B:
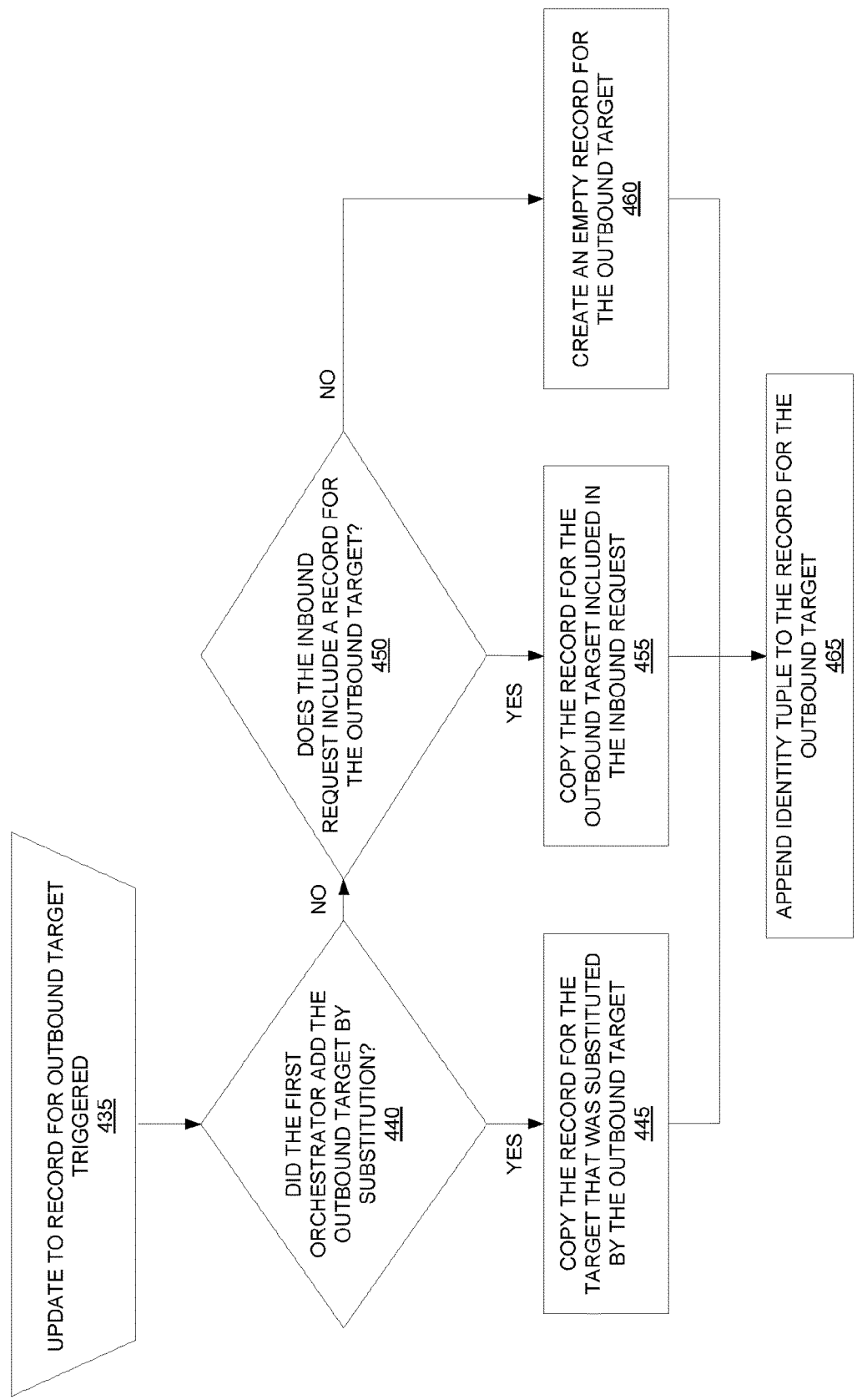
FIG. 4B is a logic flow diagram of a process for updating a record in an orchestration request for orchestration request loop prevention according to some embodiments.

FIG. 4B shows a process by which the first orchestrator 20-1 accomplishes the update to the record in Block 425 according to some embodiments. The process in FIG. 4B in particular is generic for handling any outbound target requested by the outbound request, including those targets whose request for orchestration originated at the first orchestrator 20-1 rather than another orchestrator.

As shown, the process begins once an update to the record for an outbound target is triggered, e.g., in Block 425 of FIG. 4A. Upon such triggering, the process checks whether the first orchestrator 20-1 added the outbound target by substitution (Block 440). For example, this may involve checking whether the outbound target is the same as an inbound target in an inbound orchestration request or whether the outbound target is instead a descendant that the first orchestrator 20-1 substituted for an inbound target. If the first orchestrator 20-1 did add the outbound target by substitution (YES at Block 440), the process includes copying the record for the target (e.g., inbound target) that was substituted by the outbound target (Block 445).

On the other hand, if the first orchestrator 20-1 did not add the outbound target by substitution (NO at Block 440), the process includes checking whether the inbound request includes a record for the outbound target (Block 450). That is, since in this case the outbound target was not added by substitution, the outbound target may be the same as an inbound target that was included in an inbound orchestration request. In this case, then, the process checks whether the inbound request includes a record for an inbound target that is the same as the outbound target. If so (YES at Block 450), the process entails copying the record for the outbound target included in the inbound request (Block 455). If not (NO at Block 450), the request for orchestration of the outbound target has originated with the first orchestrator 20-1. The process therefore includes creating an empty (i.e., initial) record for the outbound record (Block 460).

The process thus far has formed the record that will be included in the outbound request for the outbound target to partially indicate the ancestry of the outbound request attributable to the outbound target. The indication is only partial in that it does not indicate the first domain's impending request to the second domain 10-2 for orchestration of the outbound target. The process in this regard next includes completing the indication by appending an identity tuple to the record for the outbound target, where the identity tuple includes an identity of the outbound target, an identity of the first domain 10-1 as the requestor domain, and an identity of the second domain 10-2 as the requestee domain (Block 465). As mentioned above, this may involve the first orchestrator 20-1 calculating one or more hashes of the identity tuple, and inserting the one or more calculated hashes into the record (e.g., in the form of a Bloom filter).

Considering this process in the example of FIG. 3, for instance, after the second domain 10-2 substitutes VNF A for VNF B2, the second domain 10-2 copies Bloom filter BF2 included in orchestration request OR1 (in Block 445 of FIG. 4B). The second domain 10-2 then calculates two hashes of the identity tuple {A, ID2, ID1} and inserts the calculated hashes into the copied Bloom filter BF2, in order to effectively update that Bloom filter BF2 to reflect the second domain 10-2 requesting the first domain 10-1 to orchestrate VNF A.

Whereas the record(s) 26 in an inbound orchestration request 22 in some embodiments above indicate an ancestry of that request 22, the record(s) 26 in other embodiments herein indicate an ancestry of each inbound target(s) 24. The record(s) 26 for instance may include, for each inbound target 24, a record that indicates the ancestry of that inbound target 24. In this case, the record 26 for any given inbound target 24 may for example indicate any ancestors of that given inbound target 24, e.g., any targets from which the inbound target 24 was derived by substitution. The record 26 may do so in a domain agnostic way so that the record 26 just indicates identities associated with any targets that are ancestors of the inbound target 24, without indicating any sort of domain by domain propagation of orchestration requests that contributed to the inbound target's ancestry. In fact, in some embodiments, the identity associated with any given target in the ancestry may even be a random or local identity (e.g., a random number) generated by whichever orchestrator derived that given target.

Figure 5:
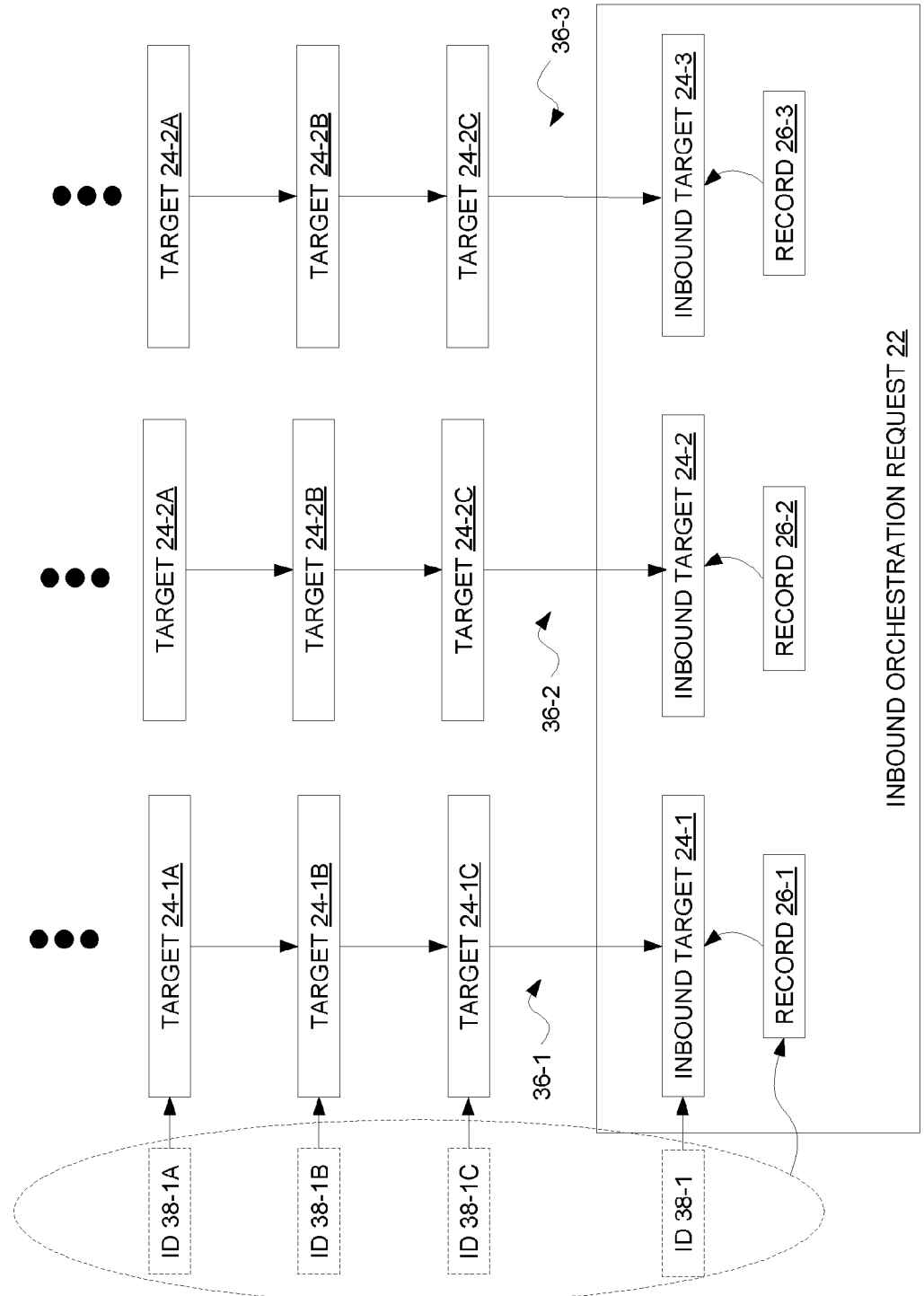
FIG. 5 is a block diagram of the ancestry of each of multiple inbound targets whose orchestration is requested by an inbound orchestration request according to some embodiments.

FIG. 5 shows one example. In FIG. 5, the inbound orchestration request 22 requests the orchestration of inbound targets 24-1, 24-2, and 24-3. The request 22 includes record 26-1 that indicates the ancestry 36-1 of inbound target 24-1, record 26-2 that indicates the ancestry 36-2 of inbound target 24-2, and record 26-3 that indicates the ancestry 36-3 of inbound target 24-3. As indicated by the record 26-1 for inbound target 24-1, the ancestry 36-1 of inbound target 24-1 includes a target 24-1C as an ancestor from which the inbound target 24-1 directly descended, a target 24-1B as an ancestor from which target 24-1C descended, and a target 24-1A as an ancestor from which target 24-1B descended. This ancestry may have formed, for instance, by way of one domain substituting target 24-1B for target 24-1A, another domain substituting target 241-C for target 24-1B, and yet another domain substituting inbound target 24-1 for target 24-1C. The record 26-1 in this case may however simply indicate an identity 38-1 associated with the inbound target 24-1 and identities 38-1A, 38-1B, and 38-1C associated with the targets 24-1A, 24-1B, and 24-1C that are ancestors of the inbound target 24-1, without indicating which domains made the target substitutions.

Similarly, as indicated by the record 26-2 for inbound target 24-2, the ancestry 36-2 of inbound target 24-2 includes a target 24-2C as an ancestor from which the inbound target 24-2 directly descended, a target 24-2B as an ancestor from which target 24-2C descended, and a target 24-2A as an ancestor from which target 24-2B descended. And, as indicated by the record 26-3 for inbound target 24-3, the ancestry 36-3 of inbound target 24-3 includes a target 24-3C as an ancestor from which the inbound target 24-3 directly descended, a target 24-3B as an ancestor from which target 24-3C descended, and a target 24-3A as an ancestor from which target 24-3B descended. Note, too, that the ancestries 36-1, 36-2, and 36-3 may in some embodiments overlap or have one or more ancestors in common. For example, target 24-1C and target 24-2C may be the same target if target 24-1/2C was a compound target for which inbound targets 24-1 and 24-2 were substituted as component targets.

A record 26 for a target may in some embodiments capture the lineage, chaining, and/or ordering of the ancestors in the target's ancestry, e.g., target 24-1A is the ancestor of target 24-1B, target 24-1B is the ancestor of target 24-1C, and target 24-1C is the ancestor of target 24-1. In other embodiments, though, a record 26 for a target may simply identify the ancestors in the target's ancestry, without explicitly or more particularly identifying how those ancestors are related or ordered in that ancestry. That is, the record 26 in this case may indicate the target's ancestry in the sense that the record 26 simply identifies the target's ancestors, without more explicitly reflecting the relationship or lineage between those ancestors.

Note further that, without the record(s) 26 indicating the domain by domain propagation of orchestration requests that contributed to an inbound target's ancestry, the first orchestrator 20-1 in some embodiments may evaluate whether or not to send to the second domain 10-2 the outbound orchestration request 28 requesting orchestration of the outbound target 30 based not only on the record(s) 26 included in the inbound orchestration request 22 but also on one or more records 40 stored at the first orchestrator 20-1. For example, the first orchestrator 20-1 in some embodiments may maintain a stored record 40, as shown in FIG. 1, for each pending outbound target that is pending with respect to the second domain 10-2. A pending outbound target in this regard is pending with respect to the second domain 10-2 if the first orchestrator 20-1 has sent a request to the second domain 10-2 to orchestrate the pending outbound target, but the first orchestrator 20-1 has not yet received an acknowledgement from the second domain 10-2 indicating whether the second domain 10-2 accepts or rejects that request. Regardless the stored record 40 for a pending outbound target indicates an ancestry of the pending outbound target as of when the first orchestrator 20-1 requested the second domain 10-2 to orchestrate the pending outbound target. The stored record 40 for such a pending outbound target may be specific to the second domain 10-2. The first orchestrator 20-1 may maintain one or more other stored records (not shown) specific to one or more other domains as well.

No matter the particular nature of the stored record(s) 40, the first orchestrator 20-1 may evaluate whether or not to send the outbound orchestration request 28 to the second domain 10-2 based on the one or more records 26 included in the inbound orchestration request 22 and on one or more stored records 40 at the first orchestrator 20-1 for one or more pending outbound targets that are pending with respect to the second domain 10-2. In some embodiments, for instance, the first orchestrator 20-1 decides to not send the outbound orchestration request 28 to the second domain 10-2 responsive to determining that each of multiple blocking conditions is met. These blocking conditions may include that a stored record 40 is maintained at the first orchestrator 20-1 for a pending outbound target that is pending with respect to the second domain 10-2 and that is of the same type as the outbound target. The blocking conditions may also include that the ancestry of the pending outbound target that is of the same type as the outbound target 30 at least partially overlaps with the ancestry of at least one of the one or more inbound targets 24.

Consider for instance a scenario where the record for an inbound target indicates the ancestry of the inbound target and comprises an inbound Bloom filter. The inbound Bloom filter may include an identity associated with the inbound target and an identity associated with each ancestor of the inbound target. Similarly, the stored record for a pending outbound target may comprise an outbound Bloom filter. The outbound Bloom filter may include an identity associated with the pending outbound target and an identity associated with each ancestor of the pending outbound target. In this case, then, the ancestry of the pending outbound target that is of the same type as the outbound target 30 at least partially overlaps with the ancestry of at least one of the one or more inbound targets 24 if the outbound Bloom filter for that pending outbound target is included in the inbound Bloom filter for at least one of the one or more inbound targets.

Figure 6:
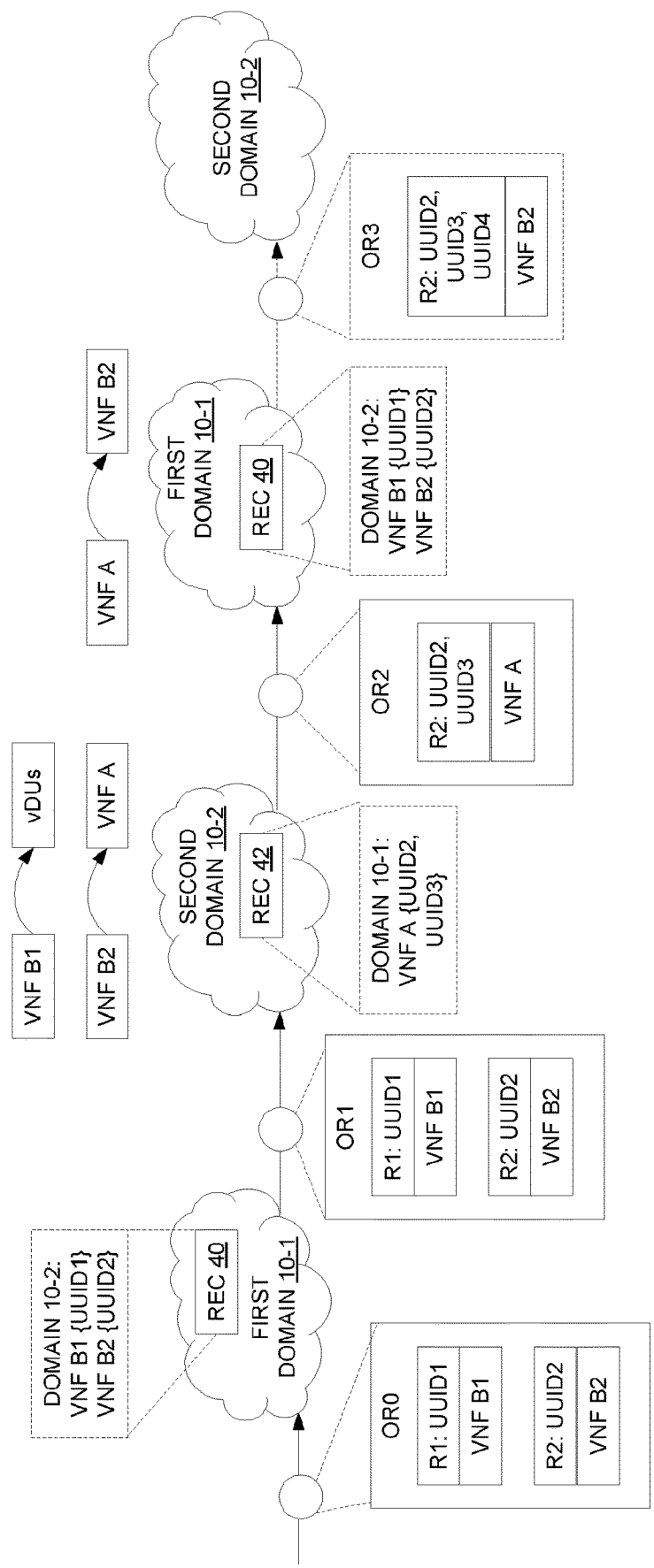
FIG. 6 is a block diagram illustrating an example of multi-domain orchestration with orchestration request loop prevention according to other embodiments.

FIG. 6 shows one example of these embodiments. In FIG. 6, the first domain 10-1 receives an orchestration request OR0, e.g., from another domain not shown. The orchestration request OR0 requests the orchestration of VNF B1 and VNF B2 as targets. The orchestration request OR0 includes record R1 for VNF B1 and record R2 for VNF B2. The record R1 indicates the ancestry of VNF B1, whereas record R2 indicates the ancestry of VNF B2. In this regard, the record R1 includes an identifier associated with VNF B1, shown here as a universally unique identifier UUID1. Similarly, the record R2 includes an identifier associated with VNF B2, shown here as a universally unique identifier UUID2.

Responsive to receiving this orchestration request OR1, the first domain 10-1 decides to delegate orchestration of VNF B1 and VNF B2 to the second domain 10-2, i.e., without substituting VNF B1 for another VNF and without substituting VNF B2 for another VNF. The first domain 10-1 therefore transmits to the second domain 10-2 orchestration request OR1 that requests orchestration of the same VNF B1 and VNF B2. The orchestration request OR1 also includes the same records R1 and R2 as that included in orchestration OR0. That is, the first domain 10-1 does not modify or update the records R1, R2. This is because the first domain 10-1 did not perform substitution so as to create descendants of (and thereby effect the ancestry of) either VNF B1 or VNF B2. The first domain 10-1 does however store a record 40 for each pending outbound target that is pending with respect to the second domain 10-2; namely for each of VNF B1 and VNF B2. One record 40 indicates the ancestry of VNF B1 and the other record indicates the ancestry of VNF B2, as of when the first orchestrator 20-1 requested the second domain 10-2 to orchestrate the corresponding pending outbound target. The record indicating the ancestry of a target may for instance comprise a list of one or more identities associated with the targets in that ancestry. With the ancestry of VNF B1 and VNF B2 at this point in the example only including the targets themselves, the first domain 10-1 here stores one record that indicates the ancestry of VNF B1 as a list that includes an identity UUID1 associated with VNF B1 itself and stores another record that indicates the ancestry of VNF B2 as a list that includes an identity UUID2 associated with VNF B2.

Responsive to receiving orchestration request OR1, the second domain 10-2 substitutes VNF B1 with one or more virtualization deployment units (vDUs) so as to itself orchestrate VNF B1 as requested. However, the second domain 10-2 substitutes VNF B2 with VNF A (and possibly one or more vDUs) and decides to delegate orchestration of VNF A back to the first domain 10-1. The second domain 10-2 therefore sends an orchestration request OR2 to the first domain 10-1 requesting orchestration of VNF A. Before sending the request OR2, though, the second domain 10-2 updates the record R2 that was included in orchestration request OR1 for VNF B2 to now contain an identity associated with VNF A, shown here as a universally unique identifier UUID3. It is this updated record R2 that the second domain 10-2 includes in the orchestration request OR2 to the first domain 10-1. The second domain 10-2 also stores a record 42 for each pending outbound target that is pending with respect to the first domain 10-1, in order to indicate the ancestry of each pending outbound target as of when the second domain 10-2 requested the first domain 10-1 to orchestrate it. The record 42 in this example indicates the ancestry of VNF A as a list that includes an identity UUID 3 associated with VNF A as well as an identity UUID2 associated with an ancestor of VNF A.

Responsive to receiving orchestration request OR2, the first domain 10-1 substitutes VNF A with VNF B2 and tentatively decides to delegate orchestration of VNF B2 back to the second domain 10-2. The first domain 10-1 accordingly updates the record R2 that was included in orchestration request OR2 for VNF A to now contain an identity associated with VNF B2, shown here as a universally unique identifier UUID4. The first domain 10-1 generates orchestration request OR3 to include this updated record R2 and then decides whether to actually send the orchestration request OR3 to the second domain 10-2 for requesting orchestration of VNF B2. The first domain 10-1 decides this based on whether each of multiple blocking conditions is met. One blocking condition is that a stored record is maintained at the first domain 10-1 for a pending outbound target that is pending with respect to the second domain 10-2 and that is of the type VNF B2; that is, the type of the outbound target. Another blocking condition is that the ancestry of VNF B2 at least partially overlaps with the ancestry of at least one of the inbound targets, which in this example includes VNF A. The first domain 10-1 may check these blocking conditions by fetching any record 40 for pending outbound targets that are pending with respect to the second domain 10-2 and looking for VNF B2 (as a VNF of type B2 is about to be requested). For all requests for VNF B2 to the second domain 10-2, the first domain 10-1 reads the identifiers associated with the targets requested. If any of the identifiers matches any of the identifiers in the record R2 included in the pending orchestration request OR3, the first domain 10-1 blocks that orchestration request OR3. In this example, then, the record 40 of requests for VNF B2 to the second domain 10-2 includes an identifier UUID2. Because this identifier UUID2 is included in the record R2 that the orchestration request OR3 has for VNF B2, the first domain 10-1 blocks orchestration request OR3 to the second domain 10-2.

Note that the records R1 and R2 in the orchestration requests and/or the stored records 40, 42 may be implemented as Bloom filters or any other sort of data structure. When implemented as Bloom filters, for example, the first domain 10-1 in FIG. 6 would check whether the Bloom filter R2 included in the orchestration request OR3 for VNF B2 contains all or part of the Bloom filter for VNF B2 stored in the record 40 (or all or part of the identities stored in the Bloom filter for VNF B2 stored in the record 40).

Figure 7:
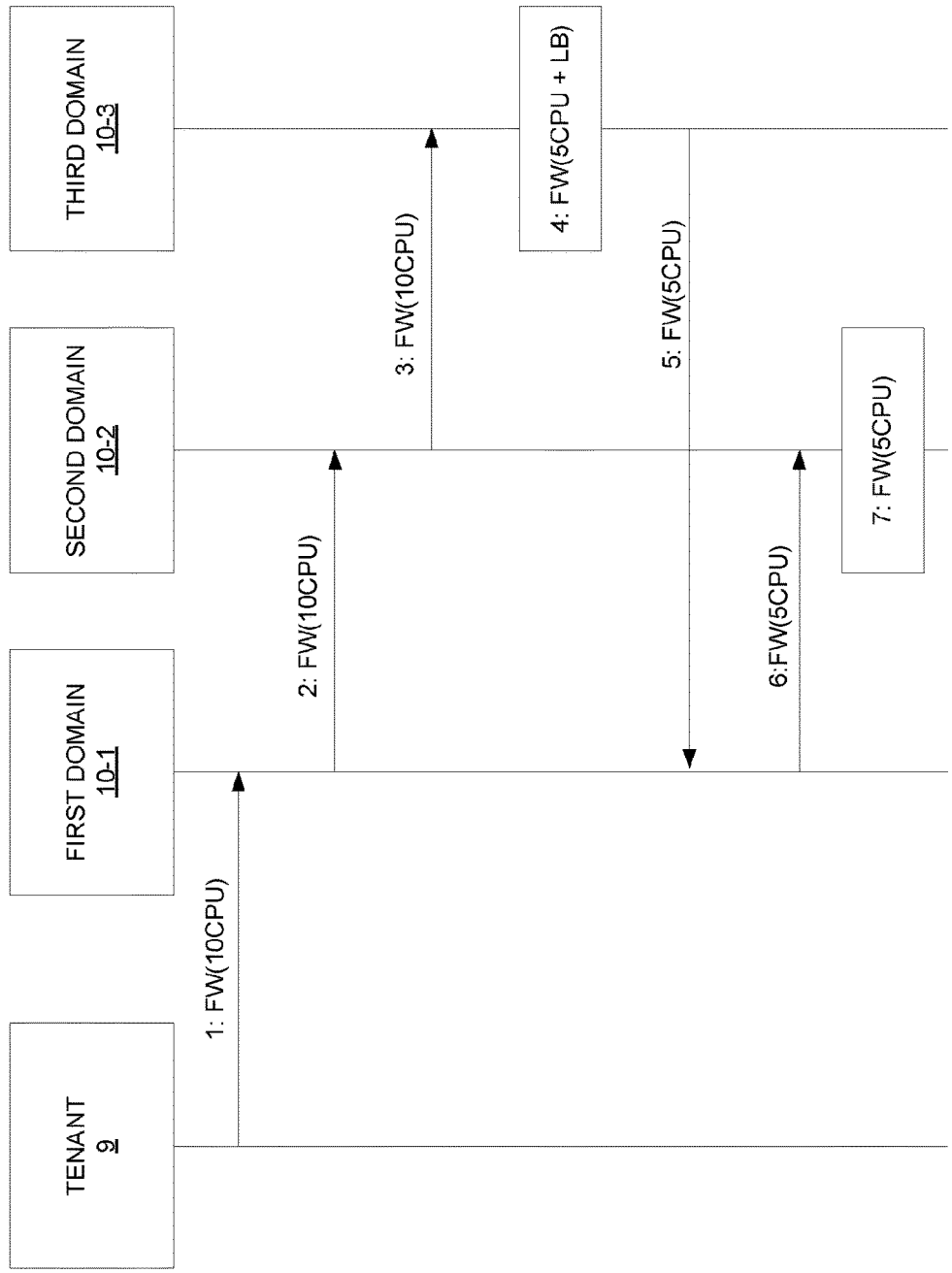
FIG. 7 is a call flow diagram illustrating an example of orchestration request loop prevention that accounts for resource requirements according to some embodiments.

No matter the particular way implemented, the first orchestrator 20-1 in some embodiments above avoids orchestration request loops by generally avoiding sending multiple orchestration requests to the second domain 10-2 for the same type of target. In other embodiments herein, the first orchestrator 20-1 more particularly avoids sending multiple orchestration requests to the second domain 10-2 for both the same type of target and for the same amount of resources. Indeed, requesting the second domain 10-2 to orchestrate the same type of target as previously requested, but with a lesser requirement on the amount of resources that the second domain 10-2 must devote to that type of target, may mean that the second domain 10-2 can accommodate the request this time. FIG. 7 shows an example use case.

As illustrated in FIG. 7, a tenant 9 requests a firewall (FW) VNF in the first domain 10-1, which requires 10 CPU resources (Step 1). The first domain 10-1 delegates orchestration of the FW, including all 10 CPU resources, to the second domain 10-2 (Step 2). The second domain 10-2 similarly delegates orchestration of the FW, including all 10 CPU resources, to a third domain 10-3 (Step 3). The third domain 10-3 decomposes the FW into a load balancer (LB) and two FWs, each requiring 5 CPU resources. The third domain 10-3 then orchestrates/deploys the LB and one of the FWs (Step 4), but delegates the other FW to the first domain 10-1 (Step 5). The first domain 10-1 at this point decides whether to delegate the FW, requiring 5 CPU resources, to the second domain 10-2. Even though the first domain 10-1 has already previously requested that the second domain 10-2 orchestrate a FW at Step 2, that previous request was for a FW requiring 10 CPU resources. Because the request under consideration now is for a FW requiring fewer resources (only 5), the first domain 10-1 decides to in fact delegate orchestration of the FW requiring 5 CPU resources to the second domain 10-2 (Step 6). In fact, in this example, the second domain 10-2 this time can orchestrate/deploy the FW with 5 CPU resources (Step 7).

To take resource requirements into account as illustrated above, the stored record 40 at the first orchestrator 20-1 for a pending outbound target may in some embodiments notably indicate the resource requirements of that pending outbound target. And the orchestration requests may similarly indicate the resource requirements of any targets for which orchestration is requested. This way, the first orchestrator 20-1 may selectively block an outbound orchestration request to the second domain 10-2 only if it requests the same amount of (or more) resources for the orchestration of an outbound target as was previously requested of the second domain 10-2 (and recorded in the stored record 40). If the outbound orchestration request requests fewer resources than previously requested of the second domain 10-2 for that outbound target, the first orchestrator 20-1 may allow the request, e.g., as the second domain 10-2 may be able to accommodate that request for fewer resources, even if the second domain 10-2 was not able to accommodate the previous request for more resources. The blocking conditions described above may therefore further include that the resource requirements of the pending outbound target that is of the same type as the outbound target are less than or equal to resource requirements of the outbound target.

Figure 8A:
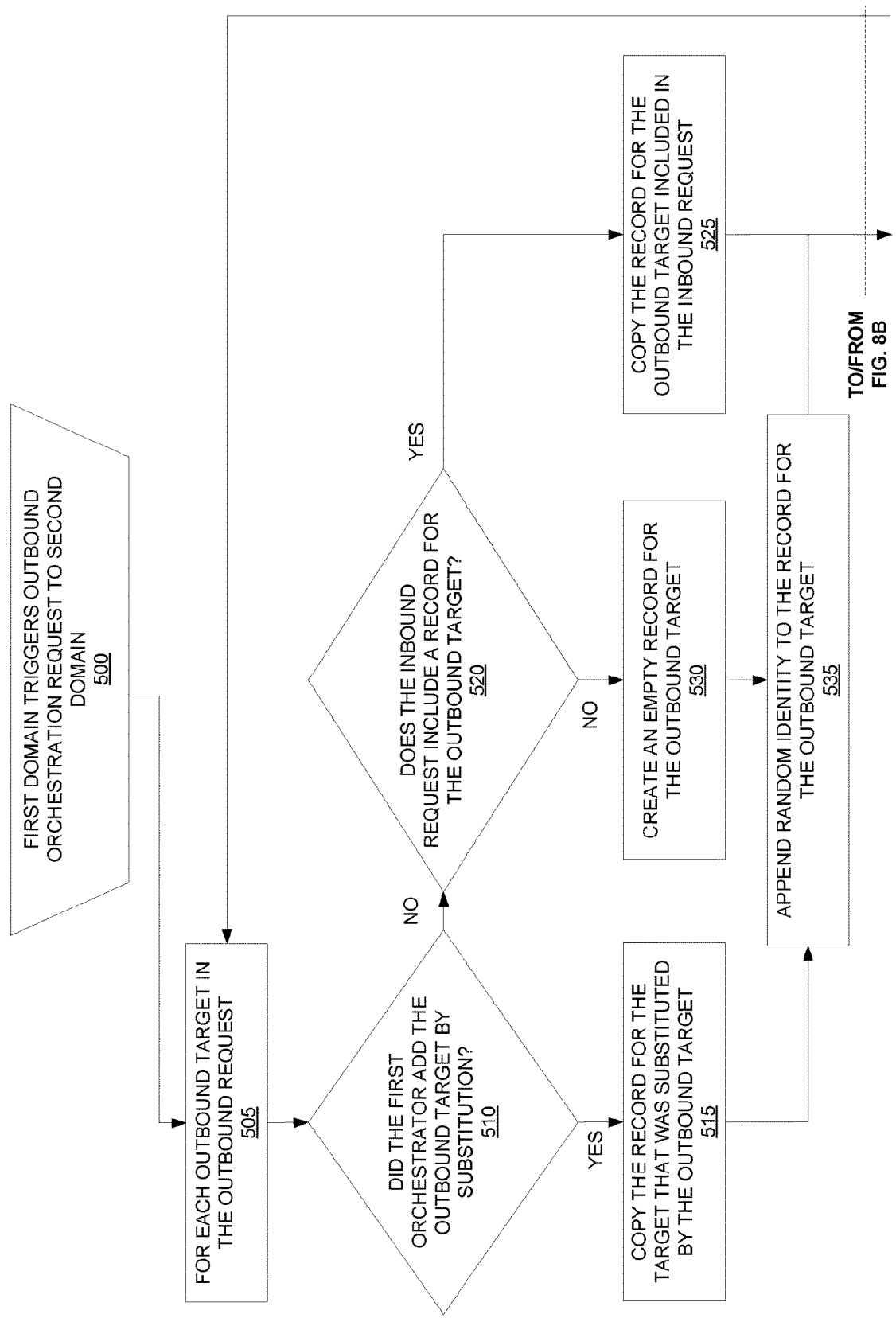
FIGS. 8A-8B are a logic flow diagram of a process for selectively sending an orchestration request to another domain, accounting for resource requirements, according to some embodiments.
Figure 8B:
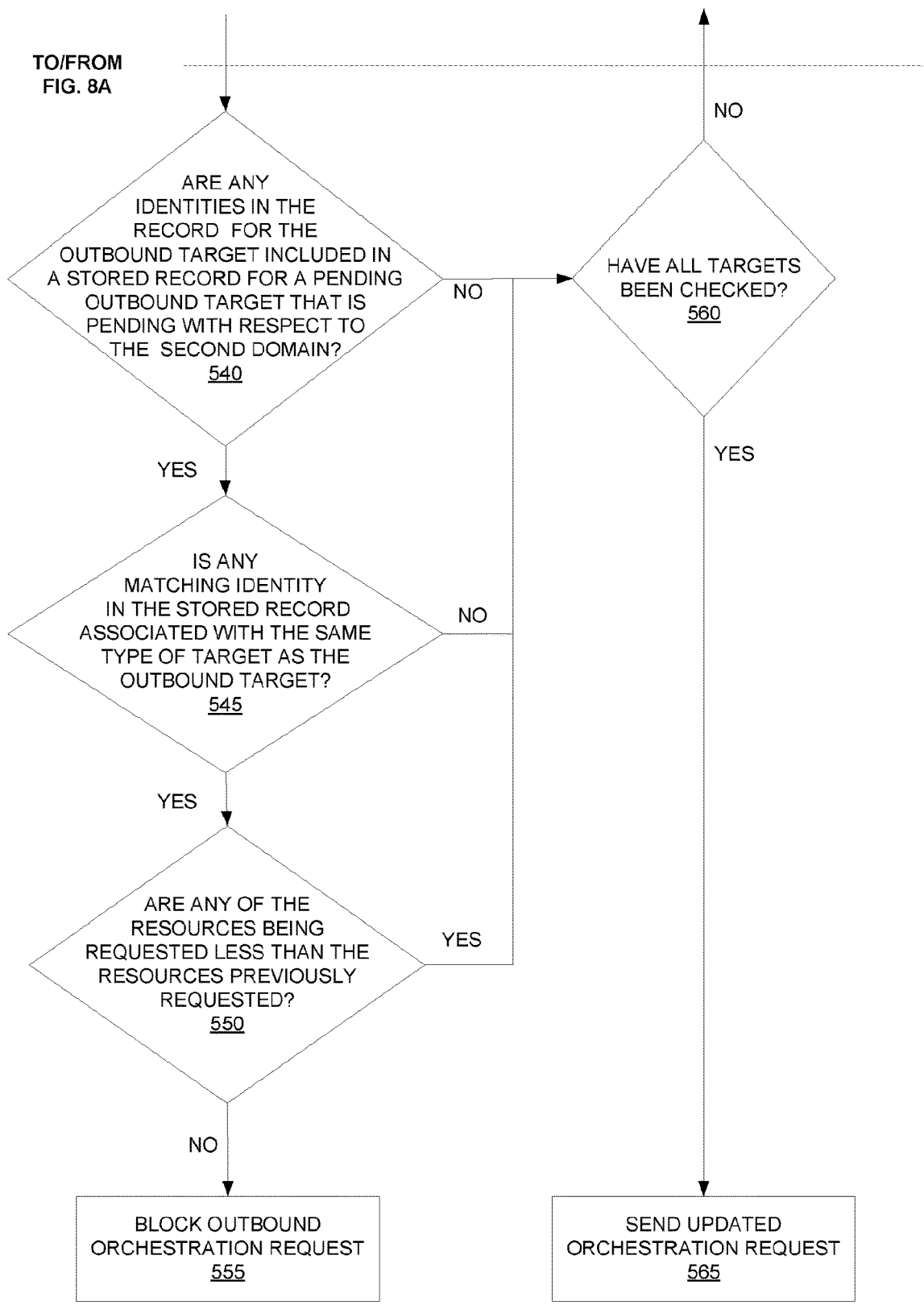

FIGS. 8A-8B illustrate additional details of a process for accommodating resource requirements using stored record(s) 40 at the first orchestrator 20-1 according to some embodiments. As shown, the process begins when the first domain 10-1 triggers an outbound orchestration request 28 to the second domain 10-2 (Block 500).

The process performs the following for each outbound target in the outbound orchestration request 28 (Block 505). The process checks whether the first orchestrator 20-1 added the outbound target by substitution (Block 510). For example, this may involve checking whether the outbound target is the same as an inbound target in an inbound orchestration request or whether the outbound target is instead a descendant that the first orchestrator 20-1 substituted for an inbound target. If the first orchestrator 20-1 did add the outbound target by substitution (YES at Block 510), that substitution impacted the ancestry of the outbound target. The first orchestrator 20-1 therefore copies the record for the target (e.g., inbound target) that was substituted by the outbound target (Block 515), since this record reflects the ancestry of the outbound target prior to the first orchestrator's substitution. The first orchestrator 20-1 then appends a random identity to the copied record for the outbound target (Block 535), so that the record reflects the full ancestry of the outbound target, including the outbound target itself.

On the other hand, if the first orchestrator 20-1 did not add the outbound target by substitution (NO at Block 510), the process includes checking whether the inbound request includes a record for the outbound target (Block 520). That is, since in this case the outbound target was not added by substitution, the outbound target may be the same as an inbound target that was included in an inbound orchestration request. In this case, then, the process checks whether the inbound request includes a record for an inbound target that is the same as the outbound target. If so (YES at Block 520), that means the first orchestrator 20-1 has not impacted the outbound target's ancestry. The first orchestrator 20-1 therefore just copies the record for the outbound target included in the inbound request (Block 525), without appending any random identity to the copied record for the outbound target itself.

But, if the inbound request does not include a record for an inbound target that is the same as the outbound target (NO at Block 520), that means the request for orchestration of the outbound target has originated with the first orchestrator 20-1 and that the outbound target is the start of an ancestry line. The process therefore includes creating an empty (i.e., initial) record for the outbound record (Block 530) and appending a random identity to the copied record for the outbound target (Block 535).

The process thus far has formed the record that will be included in the outbound request for the outbound target to indicate the ancestry of the outbound target. The process next includes evaluating whether the first orchestrator 20-1 should block the outbound orchestration request due to the inclusion of outbound target in that request.

This evaluation first entails checking whether there are any identities in the record for the outbound target included in a stored record 40 for a pending outbound target that is pending with respect to the second domain 10-2 (Block 540); that is, whether any identities in the record for the outbound target match an identity included in a stored record 40 for a pending outbound target that is pending with respect to the second domain 10-2. If so (YES at Block 540), the evaluation then includes checking whether any matching identity in the stored record 40 is associated with the same type of target as the outbound target (Block 545). If so (YES at Block 545), the evaluation next includes checking whether any of the resources being requested for the outbound target are less than the resources previously requested for that target (Block 550). This check may be with respect to all required resources and all resource types (e.g., memory, storage, or latency). If not (NO at Block 550), the outbound orchestration request 28 would request orchestration of a target that is of the same type and that requires the same (or more) resources as that already previously requested of the second domain 10-2. The first orchestrator 20-1 therefore blocks the outbound orchestration request (Block 555).

On the other hand, if there are no identities in the record for the outbound target included in any stored record 40 for a pending outbound target that is pending with respect to the second domain 10-2 (NO at Block 540), that means the first orchestrator 20-1 has not previously requested the second domain 10-2 to orchestrate a target associated with the same identifier. Or, if no matching identity in such a stored record 40 is associated with the same type of target as the outbound target (NO at Block 545), that means the first orchestrator 20-1 has not previously requested the second domain 10-2 to orchestrate a target that is both associated with the same identifier and of the same type. Still further, if any of the resources being requested for the outbound target are less than the resources previously requested for that target (YES at Block 550), the outbound orchestration request 28 would request orchestration of a target that is of the same type but that requires the fewer resources than that already previously requested of the second domain 10-2. In any of these cases, then, inclusion of the outbound target in the outbound orchestration request 28 will not cause the first orchestrator 20-1 to block the request. The process in this case therefore continues with determining whether all targets in the outbound orchestration request 28 have been checked (Block 560). If not (NO at Block 560), the process repeats for checking whether any heretofore unconsidered target should cause the request 28 to be blocked. If so, though, (YES at Block 560), the process concludes with sending the outbound orchestration request 28, as updated by the process to reflect any changes in the outbound target(s)' ancestry.

Note that use of stored state at an orchestrator in these embodiments may enable an orchestrator to take resource requirements into account while at the same time hiding a domain's topology, substitutions, and resource details. In other embodiments where such hiding is deemed less important, information about the resource requirements may be embedded in an orchestration request itself, rather than in stored state at an orchestrator, along with ancestry information as described in FIGS. 2A-4B.

Note further that, although embodiments above have been illustrated for simplicity using two domains as an example, embodiments herein are applicable to any number of domains and any network topology. Note also in this regard that embodiments herein may be applied to any hierarchical orchestration system that allows multiple hierarchies in parallel, e.g., for multi-provider orchestration systems. Each orchestrator may provide orchestration services over the complete footprint of a domain, for customers local to that domain, and may implement recursive substitutions. In such systems, tenant requests can arrive to any operator resulting in a per-tenant basis situation orchestration hierarchy. The orchestration system may generally allow loops in the orchestration control plane (as limited by embodiments herein) so that any operator can act as a single point-of-contact towards its customers.

Note also that embodiments herein may interwork with any sort of lifecycle management. This is because embodiments herein support sending multiple orchestration requests with different service components at different points in time.

Note as well that embodiments herein are applicable to any type of system that supports multi-domain orchestration in the context of cloud computing, Software Defined Networking (SDN), Network Function Virtualization (NFV), or the like. Moreover, the embodiments herein are applicable to any type of reference architectural framework. Example architectural frameworks include, for example, an ETSI NFV-Management and Orchestration (MANO) framework and an Open Networking Automation Platform (ONAP) framework.

Figure 9:
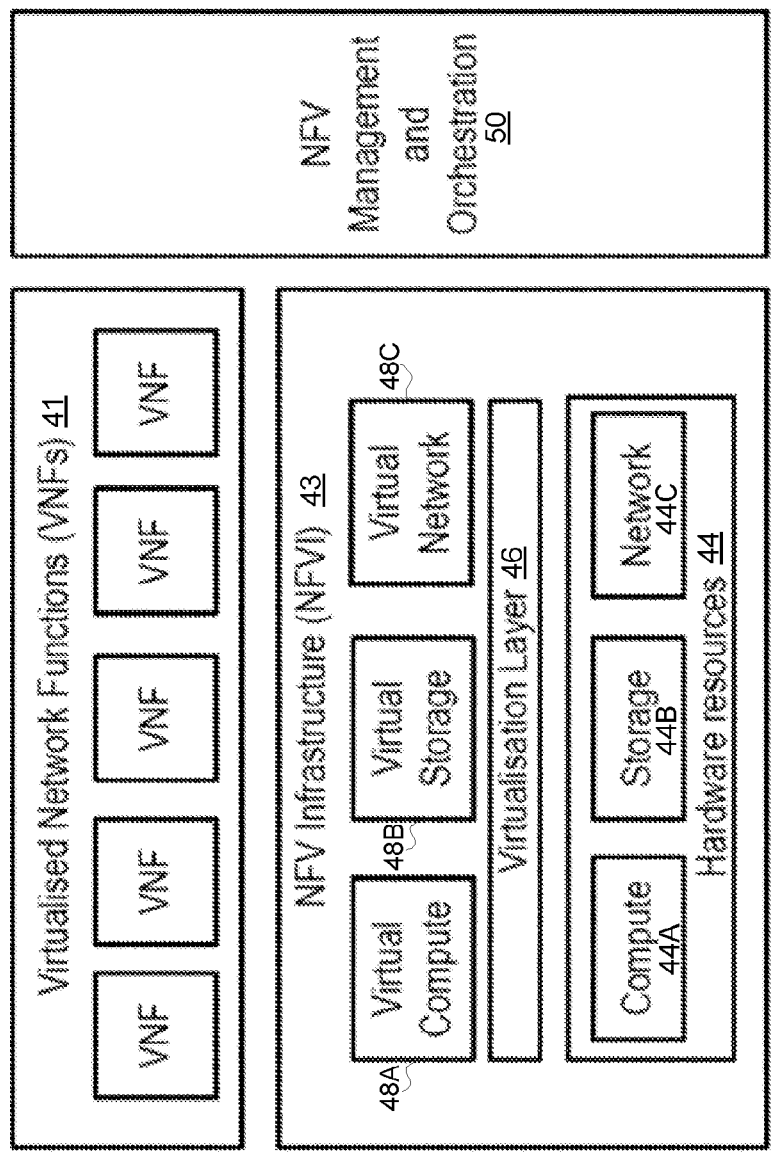
FIG. 9 is a block diagram of a Network Function Virtualization (NFV) framework according to some embodiments.

FIG. 9 illustrate additional details of one context for some embodiments in which orchestration is performed as part of NFV. As shown in FIG. 9, VNFs 41 are virtual implementations of one or more network functions (NFs) capable of running over NFV infrastructure (NFVI) 43. The NFVI 43 includes a range of physical/hardware resources 44 (e.g., hardware computer resource(s) 44A, hardware storage resource(s) 44B, and hardware network resource(s) 44C) as well as their virtualizations via a virtualization layer 46 into virtual computer resource(s) 48A, virtual storage resource(s) 48B, and virtual network resource(s) 48C. The NFVI 43 in this way supports the execution of the VNFs 41. NFV Management and Orchestration 50 covers the orchestration and lifecycle management of physical and/or virtual resources that support the infrastructure virtualization, and the lifecycle management of VNFs. NFV Management and Orchestration 50 focuses on all virtualization-specific management tasks necessary in the NFV framework. In this context, an orchestrator herein comprises or is a part of the NFV Management and Orchestration 50.

The NFV framework enables dynamic construction of management of VNF instances and the relationships between them regarding data, control, management, dependencies, and other attributes. The NFV framework thus provides the capability to load, execute, and move VNFs across different but standardized NFVI point of presence multi-vendor environments.

Figure 10:
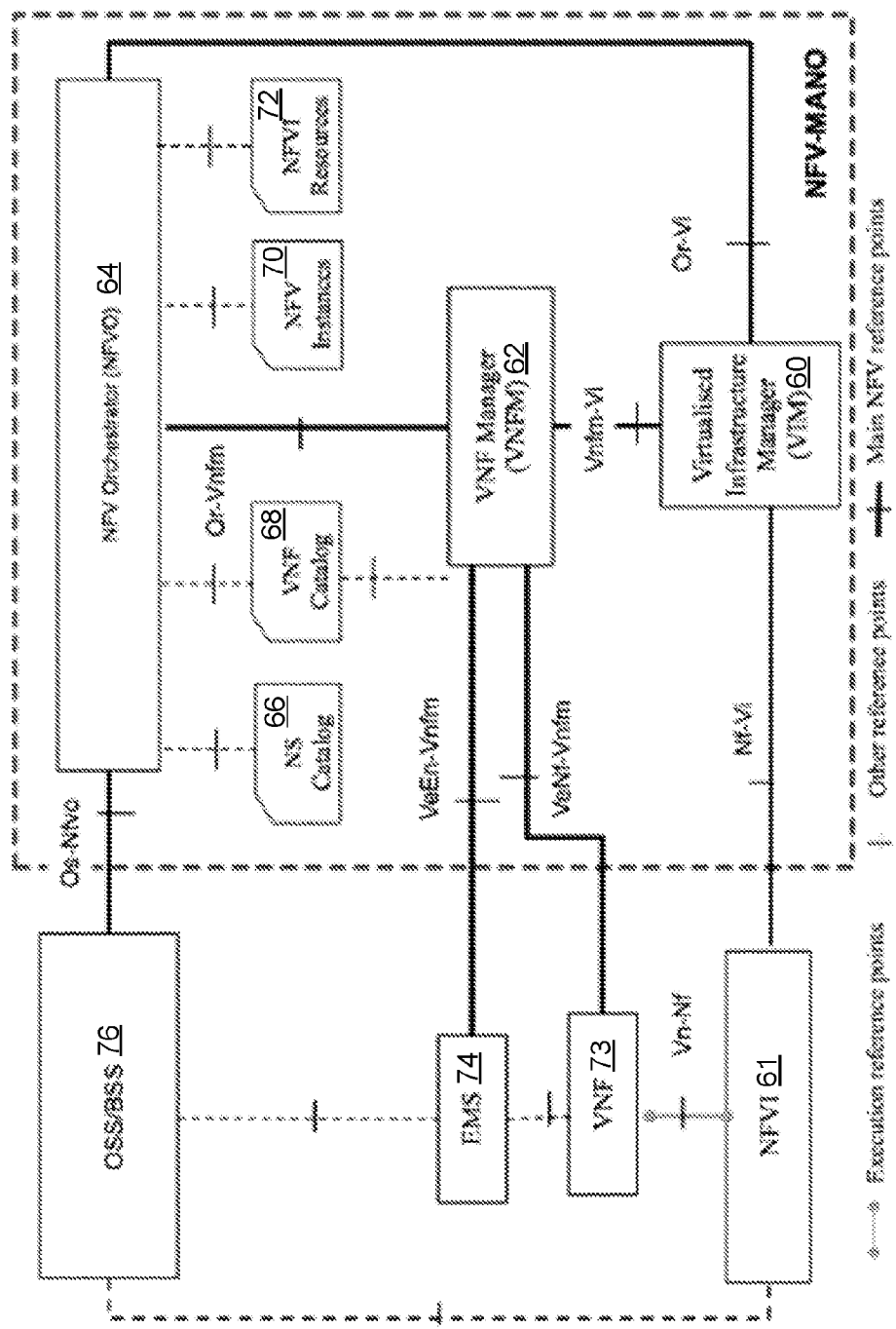
FIG. 10 is a block diagram of an NFV Management and Orchestration (MANO) architecture according to some embodiments.

FIG. 10 illustrates additional details of some embodiments where the NFV framework corresponds to the NFV Management and Orchestration (MANO) architecture standardized by the European Telecommunications Standards Institute Industry Specification Group (ETSI ISG). As shown, the NFV-MANO includes one or more Virtualized Infrastructure Managers (VIMs) 60 that are each responsible for managing resources of one NFVI 61 domain. Its operations include keeping an inventory of the allocation of virtual resources to physical resources, in order to orchestrate the allocation, upgrade, release, and reclamation of NFVI resources and optimize their use. The VIM 64 also supports management of VNF forwarding graphs by organizing virtual links, networks, subnets, and ports. The VIM 64 furthermore manages a repository of NFVI hardware resources and software resources, along with the discovery of capabilities and features to optimize the use of such resources.

The NFV-MANO also includes a VNF Manager (VNFM) 62 that oversees the lifecycle management of VNF instances. The VNFM 62 for example is responsible for instantiation of VNFs, scaling of VNFs, updating and/or upgrading VNFs, and termination of VNFs. All VNFs are assumed to have an associated VNF manager. The The NFV-MANO further includes an NFV orchestrator (NFVO) 64 responsible for on-boarding of new network services and VNF packages, NFV lifecycle management, global resource management, validation and authorization of NFVI resource requests. The NFVO 64 has the ability to coordinate, authorize, release, and engage NFVI resources independently of any specific VIM 60. It also provides governance of VNF instances sharing resources of the NFVI 61. To provide service orchestration, the NFVO 64 creates end-to-end services among different VNFs, that may be managed by different VNFMs with which the NFVO coordinates. Within this framework, an orchestrator herein may correspond to the NFVO 64 for a domain.

The NFVO 64 performs this role with the help of a network service (NS) catalog 66, a VNF catalog 68, a list of NFV instances 70, and a list of NFVI resources 72. The VNF catalog 68 is a repository of all usable VNF descriptors, where a VNF descriptor (VNFD) is a deployable template which describes a VNF in terms of its deployment and operational behavior requirements. It is primarily used by the VNFM 62 in the process of VNF instantiation and lifecycle management of a VNF instance. The information provided in the VNFD is also used by the NFVO to manage and orchestrate network services and virtualized resources on the NFVI 61. For VNFs that correspond to a service, then, the VNF catalog 68 includes service templates (e.g., in the form the VNF descriptors).

The NS catalog 66 is a catalog of usable network services. The NS catalog 66 includes a deployment template for a network service in terms of VNFs and a description of their connectivity through virtual links. The NS catalog 66 includes service templates (e.g., in the form of network service descriptors) for those respective services. As an example, a top-level service template may be a network service descriptor containing (abstract) VNF and/or PNF node templates, and each VNF or PNF node template can be substituted by a corresponding detailed VNF or PNF descriptor, i.e., a low-level service template.

The list of NFV instances 70 holds all details about network services instances and related VNF instances. And the NFVI resources 72 is a repository of NFVI resources utilized for the purpose of establishing NFV services.

Also shown in FIG. 10 for completeness, an element management system (EMS) 74 is responsible for fault, configuration, accounting, performance, and security management for the functional part of the VNF 73. And the operational support system (OSS)/business support system (BSS) 76 includes a collection of systems and applications that a service provider uses to operate its business. NFV works in coordination with the OSS/BSS 76.

Figure 11:
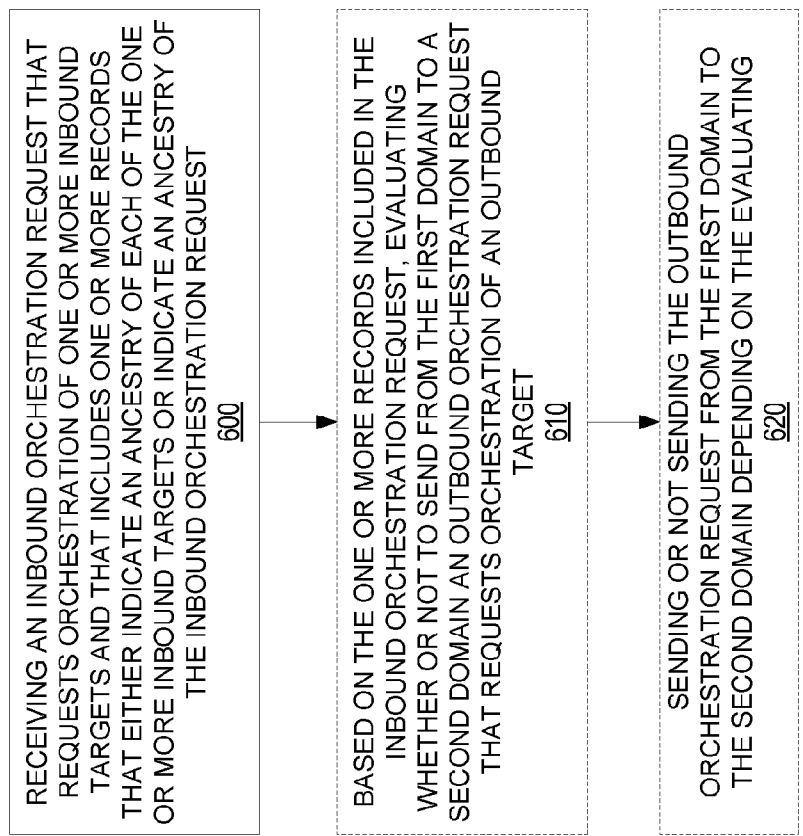
FIG. 11 is a logic flow diagram of a method performed by a first orchestrator for a first domain according to some embodiments.

In view of the above modifications and variations, FIG. 11 illustrates a method for multi-domain orchestration according to some embodiments. The method is performed by the first orchestrator 20-1 for the first domain 10-1. The method as shown includes receiving an inbound orchestration request 22 that requests orchestration of one or more inbound targets 24 and that includes one or more records 26 (Block 600). In some embodiments, the one or more records 26 indicate an ancestry of each of the one or more inbound targets 24. In other embodiments, the one or more records 26 indicate an ancestry of the inbound orchestration request 22. In this latter case, for instance, the one or more records 26 may include, for each inbound target 24, a record that indicates one or more lines in the ancestry of the inbound orchestration request 22 attributable to that inbound target.

The method in some embodiments may also include, based on the one or more records 26 included in the inbound orchestration request 22, evaluating whether or not to send from the first domain 10-1 to the second domain 10-2 an outbound orchestration request 28 that requests orchestration of an outbound target 30 (Block 610). This outbound target 30 may be one of, or may be a descendant of at least one of, the one or more inbound targets. In some embodiments, for example, this evaluation may comprises determining, based on the one or more records 26 included in the inbound orchestration request 22, whether or not the ancestry of the inbound orchestration request 22 includes the first orchestrator 20-1 requesting the second domain 10-2 to orchestrate the outbound target 30. In this case, the first orchestrator 20-1 may decide to send or not send the outbound orchestration request 28 to the second domain 10-2 depending respectively on whether the ancestry of the inbound orchestration request 22 does not include or does include the first orchestrator 20-1 requesting the second domain 10-2 to orchestrate the outbound target 30.

Regardless, the method may further include sending or not sending the outbound orchestration request 28 from the first domain 10-1 to the second domain 10-2 depending on the evaluating (Block 620).

In some embodiments not shown, the method may further include generating the outbound orchestration request 28 to include an outbound record. The outbound regard may indicate an ancestry of the outbound target or may indicate one or more lines in an ancestry of the outbound orchestration request attributable to the outbound target.

Figure 12:
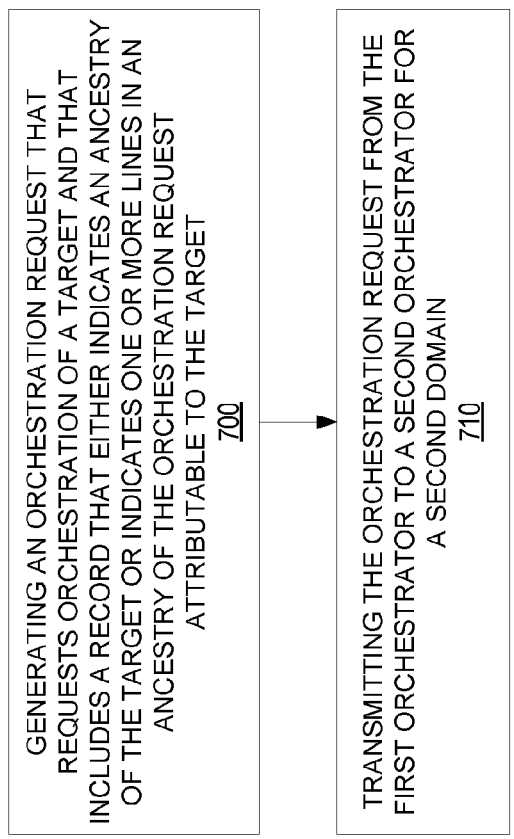
FIG. 12 is a logic flow diagram of a method performed by a first orchestrator for a first domain according to other embodiments.

FIG. 12 illustrates a method for multi-domain orchestration according to other embodiments. The method is performed by the first orchestrator 20-1 for the first domain 10-1. The method as shown includes generating an orchestration request (e.g., request 28) that requests orchestration of a target (e.g., outbound target 30) and that includes a record (e.g., outbound record 32) that either indicates an ancestry of the target or indicates one or more lines in an ancestry of the orchestration request attributable to the target (Block 700). The method also includes transmitting the orchestration request from the first orchestrator 20-1 to a second orchestrator 20-2 for a second domain 10-2 (Block 710).

Note that the first orchestrator 20-1 as described above may perform any of the processing herein by implementing any functional means or units. In one embodiment, the first orchestrator 20-1 is implemented by network equipment in the first domain 10-1, which may represent a communication network of a certain operator or provider. Regardless, the first orchestrator 20-1 may comprise respective circuits or circuitry configured to perform the steps shown in FIG. 11 and/or in FIG. 12. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 13:
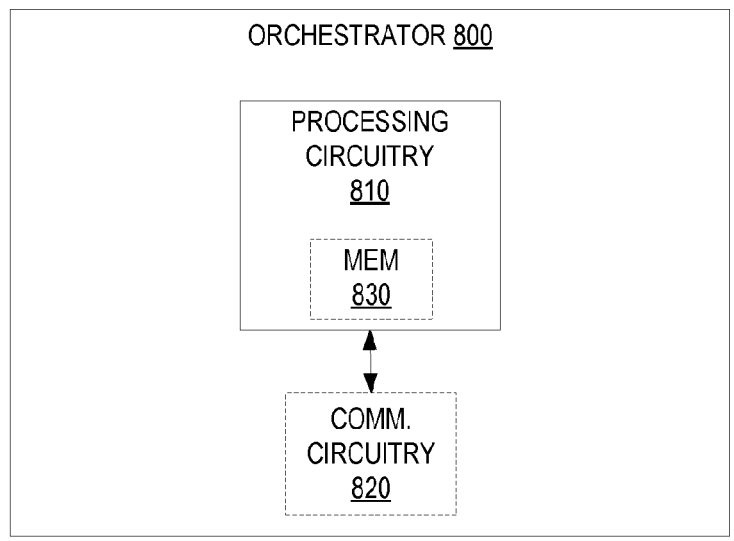
FIG. 13 is a block diagram of a first orchestrator for a first domain according to some embodiments.

FIG. 13 illustrates an orchestrator 800 (e.g., the first orchestrator 20-1) in accordance with one or more embodiments. As shown, the orchestrator 800 includes processing circuitry 810 and communication circuitry 820. The communication circuitry 820 is configured to transmit and/or receive information to and/or from one or more other nodes, e.g., via any communication technology. The communication circuitry 820 may be configured for instance to transmit and/or receive an orchestration request. The processing circuitry 810 is configured to perform processing described above, e.g., in FIG. 11 and/or in FIG. 12, such as by executing instructions stored in memory 830. The processing circuitry 810 in this regard may implement certain functional means, units, or modules.

Those skilled in the art will also appreciate that embodiments herein further include a corresponding computer program. A computer program comprises instructions which, when executed on at least one processor of the first orchestrator 20-1, cause the first orchestrator 20-1 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or (non-transitory) computer readable storage medium.

The project leading to this application has received funding from the European Union's Horizon 2020 research and innovation programme under grant agreement No 671636.

What is claimed is:

1. A method for multi-domain orchestration, the method performed by a first orchestrator for a first domain, the method comprising:
   receiving an inbound orchestration request that requests orchestration of one or more inbound targets and that includes one or more records that either indicate an ancestry of each of the one or more inbound targets or indicate an ancestry of the inbound orchestration request;
   based on the ancestry of each of the one or more inbound targets or the ancestry of the inbound orchestration request as indicated by the one or more records included in the inbound orchestration request, evaluating whether or not to send from the first domain to a second domain an outbound orchestration request that requests orchestration of an outbound target, wherein the outbound target is one of, or is a descendant of at least one of, the one or more inbound targets;
   sending or not sending the outbound orchestration request from the first domain to the second domain depending on the evaluating;
   maintaining a stored record at the first orchestrator for each pending outbound target that is pending with respect to the second domain, wherein the stored record for a pending outbound target indicates an ancestry of the pending outbound target as of when the first orchestrator requested the second domain to orchestrate the pending outbound target; and
   deciding to not send the outbound orchestration request to the second domain responsive to determining that each of multiple blocking conditions is met, wherein the blocking conditions include:
      a stored record is maintained at the first orchestrator for a pending outbound target that is pending with respect to the second domain and that is of the same type as the outbound target; and
      the ancestry of the pending outbound target that is of the same type as the outbound target at least partially overlaps with the ancestry of at least one of the one or more inbound targets.

2. The method of claim 1, wherein said evaluating comprises determining, based on the ancestry of the inbound orchestration request as indicated by the one or more records included in the inbound orchestration request, whether or not the ancestry of the inbound orchestration request includes the first orchestrator requesting the second domain to orchestrate the outbound target, and deciding to send or not send the outbound orchestration request to the second domain depending respectively on whether the ancestry of the inbound orchestration request does not include or does include the first orchestrator requesting the second domain to orchestrate the outbound target.

3. The method of claim 1, wherein the one or more records indicate an ancestry of the inbound orchestration request.

4. The method of claim 3, wherein the one or more records include, for each inbound target, a record that indicates one or more lines in the ancestry of the inbound orchestration request attributable to that inbound target.

5. The method of claim 3, wherein the record for each inbound target comprises a Bloom filter, wherein said evaluating comprises testing whether the Bloom filter for an inbound target that is or is an ancestor of the outbound target contains a set of one or more hashes of a test identity tuple, wherein the test identity tuple includes an identity of the outbound target, an identity of the first domain as the requestor domain, and an identity of the second domain as the requestee domain, and wherein said sending or not sending comprises sending or not sending the outbound orchestration request from the first domain to the second domain depending respectively on whether the Bloom filter does not contain or does contain the set of the one or more hashes of the test identity tuple.

6. The method of claim 1, further comprising generating the outbound orchestration request to include an outbound record that indicates one or more lines in an ancestry of the outbound orchestration request attributable to the outbound target.

7. The method of claim 6, further comprising generating the outbound record by:
calculating one or more hashes of an identity tuple, wherein the identity tuple includes:
an identity of the outbound target;
an identity of the first domain as a requestor domain; and
an identity of the second domain as a requestee domain; and
inserting the one or more calculated hashes into a Bloom filter comprising the outbound record.

8. The method of claim 1,
wherein said evaluating is performed based on the one or more records included in the inbound orchestration request and on one or more stored records at the first orchestrator for one or more pending outbound targets that are pending with respect to the second domain.

9. The method of claim 1, wherein:
the one or more records included in the inbound orchestration request comprise a record for each of the one or more inbound targets;
the record for an inbound target indicates the ancestry of the inbound target and comprises an inbound Bloom filter, wherein the inbound Bloom filter includes an identity associated with the inbound target and an identity associated with each ancestor of the inbound target;
wherein the stored record for a pending outbound target comprises an outbound Bloom filter, wherein the outbound Bloom filter includes an identity associated with the pending outbound target and an identity associated with each ancestor of the pending outbound target; and
the ancestry of the pending outbound target that is of the same type as the outbound target at least partially overlaps with the ancestry of at least one of the one or more inbound targets if the outbound Bloom filter for that pending outbound target is included in the inbound Bloom filter for at least one of the one or more inbound targets.

10. The method of claim 1, wherein the stored record for a pending outbound target also indicates resource requirements of the pending outbound target, wherein the outbound orchestration request requests orchestration of the outbound target with certain resource requirements, and wherein the blocking conditions further include: the resource requirements of the pending outbound target that is of the same type as the outbound target are less than or equal to resource requirements of the outbound target.

11. The method of claim 1, further comprising generating the outbound orchestration request to include an outbound record that indicates an ancestry of the outbound target, wherein generating the outbound record comprises either:
copying a record that is included in the inbound orchestration request for an inbound target that is the same as the outbound target; or
copying a record that is included in the inbound orchestration for an immediate ancestor of the outbound target, and adding to the copied record a random identity associated with the outbound target.

12. The method of claim 1, wherein the ancestry of an inbound target includes one or more direct ancestors from which the inbound target descended and for which the inbound target is a substitute.

13. A first orchestrator configured for use in a first domain, the first orchestrator comprising:
communication circuitry; and
processing circuitry configured to:
receive, via the communication circuitry, an inbound orchestration request that requests orchestration of one or more inbound targets and that includes one or more records that either indicate an ancestry of each of the one or more inbound targets or indicate an ancestry of the inbound orchestration request;
based on the one or more records included in the inbound orchestration request, evaluate whether or not to send from the first domain to a second domain an outbound orchestration request that requests orchestration of an outbound target, wherein the outbound target is one of, or is a descendant of at least one of, the one or more inbound targets;
send or not send the outbound orchestration request from the first domain to the second domain depending on the evaluating;
maintain a stored record at the first orchestrator for each pending outbound target that is pending with respect to the second domain, wherein the stored record for a pending outbound target indicates an ancestry of the pending outbound target as of when the first orchestrator requested the second domain to orchestrate the pending outbound target; and
decide to not send the outbound orchestration request to the second domain responsive to determining that each of multiple blocking conditions is met, wherein the blocking conditions include:
a stored record is maintained at the first orchestrator for a pending outbound target that is pending with respect to the second domain and that is of the same type as the outbound target; and
the ancestry of the pending outbound target that is of the same type as the outbound target at least partially overlaps with the ancestry of at least one of the one or more inbound targets.

14. The first orchestrator of claim 13, wherein the processing circuitry is configured to evaluate whether or not to send the outbound orchestration request by determining, based on the ancestry of the inbound orchestration request as indicated by the one or more records included in the inbound orchestration request, whether or not the ancestry of the inbound orchestration request includes the first orchestrator requesting the second domain to orchestrate the outbound target, and deciding to send or not send the outbound orchestration request to the second domain depending respectively on whether the ancestry of the inbound orchestration request does not include or does include the first orchestrator requesting the second domain to orchestrate the outbound target.

15. The first orchestrator of claim 13, wherein the one or more records indicate an ancestry of the inbound orchestration request, wherein the record for each inbound target comprises a Bloom filter, wherein the processing circuitry is configured to:
- evaluate whether or not to send the outbound orchestration request by testing whether the Bloom filter for an inbound target that is or is an ancestor of the outbound target contains a set of one or more hashes of a test identity tuple, wherein the test identity tuple includes an identity of the outbound target, an identity of the first domain as the requestor domain, and an identity of the second domain as the requestee domain; and
- send or not send the outbound orchestration request from the first domain to the second domain depending respectively on whether the Bloom filter does not contain or does contain the set of the one or more hashes of the test identity tuple.

* * * * *